United States Patent
Saxena et al.

(10) Patent No.: US 12,531,843 B2
(45) Date of Patent: Jan. 20, 2026

(54) SECURE PEER-TO-PEER FILE SHARING USING DISTRIBUTED OWNERSHIP DATA

(71) Applicant: Western Digital Technologies, Inc., San Jose, CA (US)

(72) Inventors: Vishwas Saxena, Bangalore (IN); Rashi Gupta, Rampur (IN); Deepankar Kansal, Bathinda (IN)

(73) Assignee: Western Digital Technologies, Inc., San Jose, CA (US)

( * ) Notice: Subject to any disclaimer, the term of this patent is extended or adjusted under 35 U.S.C. 154(b) by 115 days.

(21) Appl. No.: 18/543,545

(22) Filed: Dec. 18, 2023

(65) Prior Publication Data
US 2025/0202874 A1 Jun. 19, 2025

(51) Int. Cl.
*H04L 9/40* (2022.01)

(52) U.S. Cl.
CPC .......... *H04L 63/061* (2013.01); *H04L 63/062* (2013.01)

(58) Field of Classification Search
None
See application file for complete search history.

(56) References Cited

U.S. PATENT DOCUMENTS

| | | | |
|---|---|---|---|
| 7,949,630 B1 * | 5/2011 | Auchmoody | G06F 11/1453 707/783 |
| 8,055,788 B1 | 11/2011 | Chan | |
| 8,301,654 B2 | 10/2012 | Kodama | |
| 8,352,692 B1 * | 1/2013 | Jordan | H04L 67/1046 711/216 |
| 8,918,372 B1 * | 12/2014 | Guo | G06F 16/137 707/747 |
| 8,977,660 B1 | 3/2015 | Xin | |
| 9,344,438 B2 * | 5/2016 | Xiao | H04L 67/104 |
| 9,547,774 B2 * | 1/2017 | Bestler | G06F 3/067 |
| 9,628,438 B2 | 4/2017 | Hardin | |
| 10,019,452 B2 * | 7/2018 | Judd | G06F 16/137 |
| 10,496,599 B1 * | 12/2019 | Haravu | G06F 16/128 |
| 10,983,732 B2 * | 4/2021 | Hayes | G06F 16/182 |
| 11,062,042 B1 * | 7/2021 | McKervey | G06F 16/137 |
| 11,232,093 B2 * | 1/2022 | Dhuse | G06F 16/2255 |
| 11,233,643 B1 * | 1/2022 | Leggette | H04L 1/0057 |

(Continued)

OTHER PUBLICATIONS

Zhiyong Xu, Rui Min and Yiming Hu, "Hieras: a DHT based hierarchical P2P routing algorithm," 2003 International Conference on Parallel Processing, 2003. Proceedings., Kaohsiung, Taiwan, 2003, pp. 187-194 (Year: 2003).

(Continued)

*Primary Examiner* — Kambiz Zand
*Assistant Examiner* — Mahabub S Ahmed
(74) *Attorney, Agent, or Firm* — PATENT LAW WORKS LLP

(57) ABSTRACT

Systems, methods, and network attached storage nodes for secure peer-to-peer file sharing using consistent hashing for distributed ownership data. A plurality of network attached storage nodes may be interconnected by a network and configured for peer-to-peer communication without a centralized server. When a node receives a user data file, it divides the file into data chunks and determines hashes for those data chunks. It uses the chunk hashes to map the data chunks to other nodes for storage. It also sends ownership data for the file that includes an owner identifier, a hash key, the set of chunk hashes.

20 Claims, 17 Drawing Sheets

(56) References Cited

U.S. PATENT DOCUMENTS

| | | | |
|---|---|---|---|
| 11,431,685 B2* | 8/2022 | Marples | G06F 21/12 |
| 2004/0153458 A1* | 8/2004 | Noble | G06F 11/1464 |
| 2008/0270626 A1 | 10/2008 | Takeda | |
| 2010/0161817 A1* | 6/2010 | Xiao | H04L 67/1046 |
| | | | 709/229 |
| 2010/0318759 A1* | 12/2010 | Hamilton | G06F 11/1464 |
| | | | 711/171 |
| 2011/0107112 A1* | 5/2011 | Resch | H04L 9/0863 |
| | | | 711/216 |
| 2011/0110269 A1 | 5/2011 | Jouni | |
| 2011/0153737 A1 | 6/2011 | Chu | |
| 2011/0246433 A1* | 10/2011 | Sun | G06F 16/10 |
| | | | 707/698 |
| 2013/0036277 A1* | 2/2013 | Szczepkowski | G06F 3/0641 |
| | | | 711/E12.001 |
| 2014/0189204 A1* | 7/2014 | Sugimoto | G06F 12/0866 |
| | | | 711/119 |
| 2015/0227757 A1* | 8/2015 | Bestler | G06F 3/067 |
| | | | 713/167 |
| 2016/0077924 A1* | 3/2016 | Todd | G06F 11/1448 |
| | | | 707/698 |
| 2016/0342588 A1* | 11/2016 | Judd | G06F 16/137 |
| 2017/0017662 A1* | 1/2017 | Hayes | G06F 3/0679 |
| 2017/0163683 A1* | 6/2017 | van den Berghe | H04L 65/70 |
| 2017/0272209 A1 | 9/2017 | Yanovsky | |
| 2017/0359416 A1 | 12/2017 | Matsuda | |
| 2018/0145988 A1* | 5/2018 | Carson | H04L 9/0861 |
| 2018/0253260 A1* | 9/2018 | Marripudi | G06F 3/064 |
| 2019/0026043 A1* | 1/2019 | Chen | G06F 16/70 |
| 2019/0034507 A1* | 1/2019 | Duttagupta | G06F 16/1752 |
| 2019/0266148 A1* | 8/2019 | Dhuse | G06F 16/137 |
| 2019/0377815 A1* | 12/2019 | Karlberg | G06F 16/22 |
| 2020/0348844 A1* | 11/2020 | Danilov | G06F 3/0614 |
| 2020/0401316 A1* | 12/2020 | Hankins | G06F 12/0868 |
| 2021/0096753 A1* | 4/2021 | Lin | G06F 3/0658 |
| 2021/0124812 A1* | 4/2021 | Stolbikov | H04L 9/50 |
| 2021/0232600 A1* | 7/2021 | Bauer | G06F 16/2379 |
| 2021/0314404 A1* | 10/2021 | Glek | G06F 3/067 |
| 2022/0107931 A1* | 4/2022 | Paduroiu | G06F 16/2365 |
| 2022/0269601 A1* | 8/2022 | Monteith | G06F 3/0652 |
| 2024/0082706 A1* | 3/2024 | Astley | A63F 13/352 |
| 2024/0256568 A1* | 8/2024 | Schmoll | G06F 11/1458 |

OTHER PUBLICATIONS

Storj Labs Storj, "A Decentralized Cloud Storage Network Framework", Storj Labs, pp. 1-90, 2018.

H. Yan, Y. Jiang and X. Zhou, "A Bidirectional Chord System Based on Base-k Finger Table," 2008 International Symposium on Computer Science and Computational Technology, Shanghai, China, 2008, pp. 384-388, doi: 10.1109/ISCSCT.2008.55. (Year: 2008).

* cited by examiner

SECURE PEER-TO-PEER FILE SHARING USING DISTRIBUTED OWNERSHIP DATA

TECHNICAL FIELD

The present disclosure generally relates to peer-to-peer distributed data storage systems and, more particularly, to secure peer-to-peer file sharing without a centralized server to maintain ownership data.

BACKGROUND

Distributed cloud storage may include a collection of network attached storage (NAS) nodes used to collectively serve the data storage and retrieval needs of a large number of client systems. NAS nodes may include one or more storage controllers and switches providing intelligent access to a number of non-volatile storage devices, such as solid state drives (SSDs), hard disk drives (HDDs), or other endpoint storage elements.

Peer-to-peer file sharing may allow NAS nodes to directly transfer files among themselves without having to first send them to a central file manager. In a distributed cloud architecture, peer-to-peer file sharing may take advantage of the distributed resources of the NAS nodes and network connections to share storage and transfer burdens widely to support a large number of client systems.

In some distributed cloud storage architectures, peer-to-peer file sharing may be limited by reliance on a centralized server for coordination among the storage nodes. For example, a centralized server may be used for node directories, file ownership data, and/or security features, such as key management or authentication data. During storage operations, each file gets split into multiple chunks (shards), erasure coded per system redundancy, and encrypted before sending to multiple storage nodes. Each file's information, like shards, storage nodes, file access keys, and owner identifier may be maintained in a file ownership database in a centralized server.

Peer-to-peer sharing architectures that rely on a centralized server may have lower performance as they scale because the centralized server is involved in all file transfers and file access verification. Even if the file data is not actually routed through the centralized server, other data and authentication requests are. Centralized servers may also create a central point of failure and require special care to prevent downtime or data loss when the centralized server fails. Scaling can also become expensive as the centralized server must have the storage and processing capacity to store a database that increases linearly with the number of nodes and operations that scale similarly.

Therefore, there is a demand for a more secure, efficient, and reliable architecture to support peer-to-peer file sharing without a centralized server among distributed NAS nodes.

SUMMARY

Various aspects for secure peer-to-peer file sharing using distributed ownership data are described. More particularly, the storage node receiving a file for storage may distribute data chunks and complete ownership data for the file to a set of nodes and distribution and security may be based on file and chunk hash values.

One general aspect includes a storage system that includes a first storage node including at least one non-volatile data storage device configured to store user data units, a network interface configured for peer-to-peer communication over a network with a plurality of storage nodes, and at least one processor configured to, alone or in combination: receive a user data unit to be stored; divide the user data unit into a plurality of data chunks; determine, using chunk hashes of the plurality of data chunks, a target set of storage nodes from the plurality of storage nodes; and send, to each storage node in the target set of storage nodes a corresponding data chunk from the plurality of data chunks and ownership data comprising an owner identifier for the first storage node, a hash key for the user data unit; and the chunk hashes for the plurality of data chunks.

Implementations may include one or more of the following features. The at least one processor may be further configured to, alone or in combination and prior to sending the corresponding data chunk: erasure encode the corresponding data chunk; and encrypt the corresponding data chunk. The at least one processor may be further configured to, alone or in combination, generate a data unit hash for the user data unit and the chunk hashes for the plurality of data chunks. The ownership data may be configured in a data ownership data structure that includes a data unit entry for the user data unit comprising: the data unit hash for the user data unit; the owner identifier for the first storage node; and the hash key for the user data unit. The data ownership data structure may further include a set of chunk entries for the plurality of data chunks, and each chunk entry may include: the chunk hash for that data chunk; the data unit hash for the user data unit; and an index value configured to order the plurality of data chunks. The data unit entry may further include: a user data unit identifier for the user data unit; and a storage path value for the user data unit. The at least one processor may be further configured to, alone or in combination: determine an ownership data exchange key; and encrypt, prior to sending the ownership data and using the ownership data exchange key, the ownership data. The at least one processor may be further configured to, alone or in combination, initiate Diffie-Hellman key exchange with at least one storage node of the plurality of storage nodes to send the ownership data exchange key to the at least one storage node. The at least one storage node may be configured to: receive, using Diffie-Hellman key exchange, the ownership data exchange key; decrypt the ownership data; and store the ownership data in a data ownership data structure in a non-volatile memory of the at least one storage node. Each storage node of the plurality of storage nodes may be configured to: act as a primary owner for at least one user data unit; act as a secondary owner for at least one user data unit; and store at least one data chunk for at least one user data unit. The at least one processor may be further configured to, alone or in combination: receive, from a second storage node from the plurality of storage nodes, a share request to serve the user data unit; determine an ownership data exchange key; execute, for the ownership data exchange key, secure key exchange with the second storage node; encrypt, using the ownership data exchange key, the ownership data for the user data unit; send, to the second storage node, the encrypted ownership data for the user data unit; and send, to the set of target storage nodes, an authorization update indicating the second storage node. The storage system may include the requesting storage node configured to: receive, from a client system, a user data request for the user data unit; send the share request to the first storage node; receive the ownership data exchange key; receive the encrypted ownership data for the user data unit; decrypt, using the ownership data exchange key, the encrypted ownership data; send, based on the ownership data, a plurality of data chunk requests to the set of target storage nodes; receive, from the set of target storage nodes, the plurality of data chunks; reassemble the user data unit; and serve, to the client system, the user data unit. The at least one processor may be further configured to, alone or in combination: receive, from a client system, a user data request for the user data unit; determine the chunk hashes for the plurality of data chunks; send, based on the chunk hashes for the plurality of data chunks, authorization requests including the owner identifier to the set of target storage nodes; determine, based on each data chunk hash and the hash key, a first hash-based message authentication code for each data chunk of the plurality of data chunks; and send, to each target storage node in the set of target storage nodes, the hash-based message authentication code for the data chunk stored by that target storage node. The plurality of target storage nodes may be configured to: validate, based on the owner identifier in the authorization request and the owner identifier in the ownership data stored in that target storage node, the authorization of the first storage node; determine, based on the data chunk hash and hash key in the ownership data stored in that target storage node, a second hash-based message authentication code for the data chunk stored in that target storage node; compare the first hash-based message authentication code to the second hash-based message authentication code for the data chunk stored in that target storage node; and return, responsive to the first hash-based message authentication code matching the second hash-based message authentication code, the data chunk stored in that target storage node to the first storage node.

Another general aspect includes a computer-implemented method that includes: receiving, by a first storage node of a plurality of storage nodes, a user data unit to be stored; dividing the user data unit into a plurality of data chunks; determining, by the first storage node and using chunk hashes of the plurality of data chunks, a target set of storage nodes from the plurality of storage nodes; and sending, by the first storage node and to each storage node in the target set of storage nodes a corresponding data chunk from the plurality of data chunks and ownership data comprising an owner identifier for the first storage node, a hash key for the user data unit, and the chunk hashes for the plurality of data chunks.

Implementations may include one or more of the following features. The computer-implemented method may further include, prior to sending the corresponding data chunk: erasure encoding, by the first storage node, the corresponding data chunk; and encrypting, by the first storage node, the corresponding data chunk. The computer-implemented method may further include generating, by the first storage node, a data unit hash for the user data unit and the chunk hashes for the plurality of data chunks, where the ownership data is configured in a data ownership data structure that includes a data unit entry for the user data unit comprising: the data unit hash for the user data unit; the owner identifier for the first storage node; and the hash key for the user data unit. The data ownership data structure may further include a set of chunk entries for the plurality of data chunks and each chunk entry may include: the chunk hash for that data chunk; the data unit hash for the user data unit; and an index value configured to order the plurality of data chunks. The computer-implemented method may include: determining, by the first storage node, an ownership data exchange key; and encrypting, by the first storage node and prior to sending the ownership data, the ownership data using the ownership data exchange key. The computer-implemented method may include: initiating, by the first storage node, Diffie-Hellman key exchange with at least one storage node of the plurality of storage nodes to send the ownership data exchange key to the at least one storage node; receiving, by the at least one storage node and using Diffie-Hellman key exchange, the ownership data exchange key; decrypting, by the at least one storage node and using the ownership data exchange key, the ownership data; and storing, by the at least one storage node, the ownership data in a data ownership data structure in a non-volatile memory of the at least one storage node. The computer-implemented method may include: receiving, by the first storage node and from a second storage node in the plurality of storage nodes, a share request to serve the user data unit; determining, by the first storage node, an ownership data exchange key; executing, between the first storage node and the second storage node, secure key exchange for the ownership data exchange key; encrypting, by the first storage node and using the ownership data exchange key, the ownership data for the user data unit; sending, by the first storage node to the second storage node, the encrypted ownership data for the user data unit; and sending, by the first storage node and to the set of target storage nodes, an authorization update indicating the second storage node. The computer-implemented method may include: receiving, by the second storage node and from a client system, a user data request for the user data unit; sending, by the second storage node, the share request to the first storage node; receiving, by the second storage node, the ownership data exchange key; receiving, by the second storage node, the encrypted ownership data for the user data unit; decrypting, by the second storage node and using the ownership data exchange key, the encrypted ownership data; sending, by the second storage node and based on the ownership data, a plurality of data chunk requests to the set of target storage nodes; receiving, by the second storage node and from the set of target storage nodes, the plurality of data chunks; reassembling, by the second storage node, the user data unit; and serving, by the second storage node and to the client system, the user data unit. The computer-implemented method may include: receiving, by the first storage node and from a client system, a user data request for the user data unit; determining, by the first storage node, the chunk hashes for the plurality of data chunks; sending, by the first storage node and based on the chunk hashes for the plurality of data chunks, authorization requests including the owner identifier to the set of target storage nodes; validating, by each storage node in the set of target storage nodes, the authorization of the first storage node based on the owner identifier in the authorization request and the owner identifier in the ownership data stored in that target storage node; determining, by the first storage node and based on each data chunk hash and the hash key, a first hash-based message authentication code for each data chunk of the plurality of data chunks; sending, by the first storage node and to each target storage node in the set of target storage nodes, the hash-based message authentication code for the data chunk stored by that target storage node; determining, by each storage node in the set of target storage nodes and based on the data chunk hash and hash key in the ownership data stored in that target storage node, a second hash-based message authentication code for the data chunk stored in that target storage node; comparing, by each storage node in the set of target storage nodes, the first hash-based message authentication code to the second hash-based message authentication code for the data chunk stored in that target storage node; and returning, by each storage node in the set of target storage nodes and responsive to the first hash-based message authentication code matching the second hash-based message authentication code, the data chunk stored in that target storage node to the first storage node.

Still another general aspect includes a storage node that includes: at least one non-volatile data storage device configured to store user data units; a network interface configured for peer-to-peer communication over a network with a plurality of storage nodes; and means for receiving a user data unit to be stored; means for dividing the user data unit into a plurality of data chunks; means for determining, using chunk hashes of the plurality of data chunks, a target set of storage nodes from the plurality of storage nodes; and means for sending, to each storage node in the target set of storage nodes, a corresponding data chunk from the plurality of data chunks and ownership data comprising an owner identifier for the storage node, a hash key for the user data unit, and the chunk hashes for the plurality of data chunks.

The various embodiments advantageously apply the teachings of multi-device storage systems and/or distributed storage networks to improve the functionality of such computer systems. The various embodiments include operations to overcome or at least reduce the issues previously encountered in distributed storage arrays and/or systems and, accordingly, are more reliable and/or efficient than other computing systems. That is, the various embodiments disclosed herein include hardware and/or software with functionality to improve peer-to-peer file sharing among network attached storage nodes without a centralized server, such as by using distributed ownership data to manage shard distribution and security. Accordingly, the embodiments disclosed herein provide various improvements to storage networks and/or storage systems.

It should be understood that language used in the present disclosure has been principally selected for readability and instructional purposes, and not to limit the scope of the subject matter disclosed herein.

DETAILED DESCRIPTION

Figure 1:
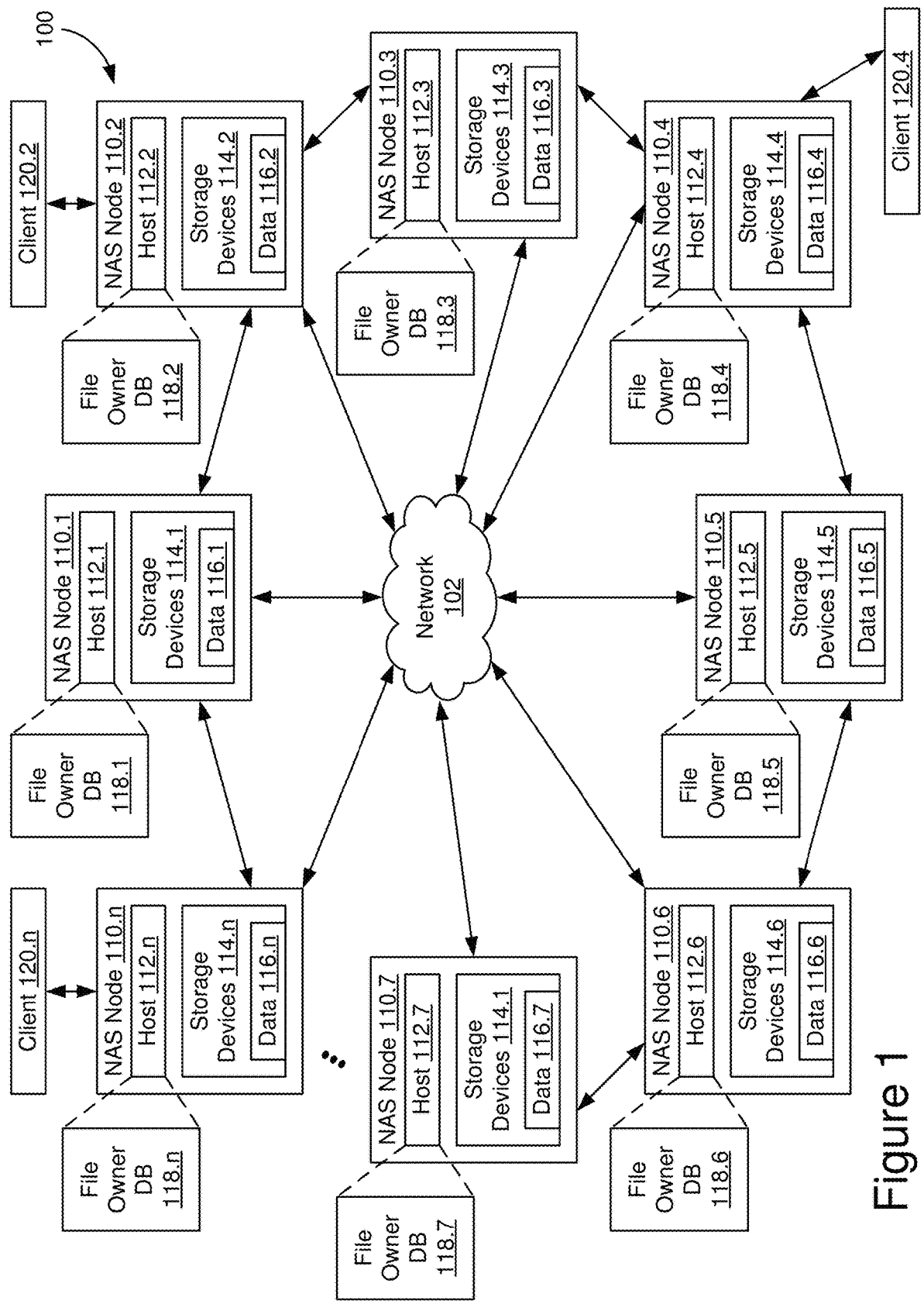
FIG. 1 schematically illustrates an example distributed cloud storage system of network attached storage nodes interconnected by a network for peer-to-peer file sharing.

FIG. 1 shows an embodiment of an example distributed data storage system 100, such as a distributed cloud storage system, with multiple network attached storage (NAS) nodes 110 supporting a plurality of client systems 120. While some example features are illustrated, various other features have not been illustrated for the sake of brevity and so as not to obscure pertinent aspects of the example embodiments disclosed herein. To that end, as a non-limiting example, data storage system 100 may include a number of NAS nodes 110 that include a host controller 112 and a number of storage devices 114 (also sometimes called information storage devices, storage devices, disk drives, or drives). For example, NAS node 110.1 may include a host controller 112.1 configured to control read/write and storage management access to one or more arrays of storage devices 114.1. In some embodiments, NAS nodes 110.1-110.n may be configured as a storage server, storage array blade, all flash array appliance, or similar storage unit for use in data center storage racks or chassis. NAS nodes 110 may interface with one or more client systems 120, such as client system 120.2, 120.4, or 120.n, and provide data storage and retrieval capabilities for or through those client systems. While client systems 120 are only shown for NAS nodes 110.2, 110.4, and 110.n, each NAS node 110 may support a plurality of client systems for data storage operations. In some embodiments, NAS nodes 110 may be configured in a storage hierarchy that includes storage nodes, storage controllers (such as host controllers 112), and/or other intermediate components between storage devices 114 and host controllers 112. For example, each host controller 112 may be responsible for a corresponding set of storage devices 114 in a storage node and their respective storage devices may be connected through corresponding switches and backplane network or internal bus architecture including a storage interface bus and/or control bus. In some embodiments, client systems 120, such as an application server, may be connected to the corresponding NAS nodes by a host interface and/or network fabric. In some embodiments, client systems 120 may access NAS nodes 110 through network 102.

NAS nodes 110 may be configured in a logical ring, where each node occupies a sequential position along the ring with a predecessor node and a successor node. For example, NAS node 110.1 is a predecessor node NAS node 110.2 and a successor node to NAS node 110.*n*. NAS node 110.2 and NAS node 110.*n* may be referred to as adjacent nodes to NAS node 110.1. In some embodiments, the relative positions of NAS nodes 110 in the node ring may be determined based on a hash-based address space using consistent hashing to locate each node in a sequential order of the ring. For example, the node ring address space may use consistent hashing in a $2^n$ address space to distribute unique hash-based node addresses throughout the address space. Examples shown in this disclosure may be based on a $2^4$ node address space corresponding to 4 bit address values and 16 ordered positions for ease of description. However, actual implementation would use a much larger address space, such as 64-byte addresses, that makes the likelihood of address collisions exceedingly small. Also note that the node ring is a logical construct that has nothing to do with the physical locations or actual internet protocol (IO) addresses of the nodes. Data storage system 100 may be based on a geographically scattered infrastructure and may include nodes located in proximity to client systems 120 to improve client access times when serving data units. Peer-to-peer communication may occur through network 102 between or among NAS nodes 110, including communication among adjacent nodes. Adjacent nodes are logically adjacent in the node ring and corresponding hash-based address space, not in any particular physical relationship or possessing a unique or dedicated communication channel between them.

Host controllers 112 may include storage controllers comprising interface and compute resources (memory and processors) for communicating with client systems 120 and storage devices 114 for managing storage operations. Host controllers 112 may include one or more central processing units (CPUs) or processors 104 that operate alone or on combination for executing compute operations, storage management operations, and/or instructions for accessing storage devices 114 through within NAS node 110. In some embodiments, processors 104 may include a plurality of processor cores which may be assigned or allocated to parallel processing tasks and/or processing threads for different storage operations and/or host storage connections. In some embodiments, host controllers 112 may include or interface with one or more physical storage interfaces, such as PCIe, fibre channel, or ethernet, to corresponding storage devices 114. In some embodiments, host controllers 112 may include or interface with one or more host or network interfaces to corresponding client systems 120. In some embodiments, host controllers 112 may include at least one network interface to network 102 for peer-to-peer communication among NAS nodes.

In some embodiments, data storage devices 114 are, or include, solid-state drives (SSDs). Each data storage device 120.1-120.*n* may include a non-volatile memory (NVM) or device controller based on compute resources (processor and memory) and a plurality of NVM or media devices to provide a non-volatile storage medium for data storage (e.g., one or more NVM device(s), such as one or more flash memory devices). In some embodiments, a respective data storage device of the one or more data storage devices 114 includes one or more NVM controllers, such as flash controllers or channel controllers (e.g., for storage devices having NVM devices in multiple memory channels). In some embodiments, data storage devices 114 may each be packaged in a housing, such as a multi-part sealed housing with a defined form factor and ports and/or connectors for interconnecting with a storage interface bus and/or control bus for communication with corresponding host controllers 112. In some embodiments, a respective data storage device may include a single medium device while in other embodiments the respective data storage device 114 includes a plurality of media devices. In some embodiments, media devices include NAND-type flash memory or NOR-type flash memory. In some embodiments, data storage device 114 may include one or more hard disk drives (HDDs). In some embodiments, data storage devices 114 may include a flash memory device, which in turn includes one or more flash memory die, one or more flash memory packages, one or more flash memory channels or the like. However, in some embodiments, one or more of the data storage devices 114 may have other types of non-volatile data storage media (e.g., phase-change random access memory (PCRAM), resistive random access memory (ReRAM), spin-transfer torque random access memory (STT-RAM), magneto-resistive random access memory (MRAM), etc.).

In some embodiments, NAS nodes 110 may be coupled through a network interface to network 102. Network 102 may include a wired and/or wireless network (e.g., public and/or private computer networks in any number and/or configuration) which may be coupled in a suitable way for transferring data. For example, the network may include any means of a conventional data communication network such as a local area network (LAN), a wide area network (WAN), a telephone network, such as the public switched telephone network (PSTN), an intranet, the internet, or any other suitable communication network or combination of communication networks. From the perspective of each NAS node 110, they may communicate with each other NAS node 110 through network 102 (though they may not have the identity or address information to communicate directly with those other nodes, as governed by the node ring configuration).

Client systems 120 may be any suitable computer device, such as a computer, a computer server, a laptop computer, a tablet device, a netbook, an internet kiosk, a personal digital assistant, a mobile phone, a smart phone, a gaming device, or any other computing device. Client systems 120 are sometimes called a host or host system, to the degree that they host data or applications for other systems. For example, client systems 120 may be cloud application servers in one or more data centers that serve hosted applications for end user devices, where those applications are supported by data, such as files, stored in storage devices 114 of NAS nodes 110. In some embodiments, client systems 120 may include a plurality of client systems owned, operated, and/or hosting applications belonging to a plurality of entities and supporting one or more quality of service (QoS) standards for those entities and their applications. In some configurations, client systems 120 may be associated with a specific NAS node 110 that acts as a primary storage node and access point for the storage resources of data storage system 100. For example, client system 120.2 may be configured with a storage or network interface to NAS node 110.2 and use storage requests to NAS node 110.2 to store and retrieve data that is distributed among NAS nodes 110. From the perspective of client system 120.2, NAS node 110.2 stores the user data files stored and accessed by client system 120.2, even though the actual files may be sharded and distributed among NAS nodes 110. NAS node 110.2 may be referred to as the primary node and/or data owner for the data units received from client system 120.2.

In some configurations, NAS nodes 110 configured in the node ring may operate as a peer-to-peer network for securely distributing data unit storage among NAS nodes 110 without the use of a centralized server for coordinating peer-to-peer sharing. Each NAS node 110 may include data 116 stored in their respective storage devices 114. In some configurations, client systems 120 may upload user data units, such as files or data objects, to a primary node and that NAS node 110 may shard, erasure encode, encrypt, and distribute the data chunks (shards) from that user data unit among NAS nodes 110. The primary node may or may not store any data chunks for the data units it receives in its own storage devices 114. The data chunks corresponding to each user data unit may be distributed among a set of NAS nodes 110 for storage in their respective storage devices 114 and the primary node may generate ownership data describing the user data unit, ownership information, the data chunks, and their locations in the node ring. Each NAS node 110 may generate data unit and chunk entries in a corresponding file ownership database (DB) 118. For example, each file received by NAS node 110.2 receives from client system 120.2 may be represented by a corresponding file entry and a set of chunk entries describing the distributed data chunks that make up that file (and need to be returned to for client read operations). In some configurations, the ownership data may be distributed among the file ownership databases 118 in NAS nodes 110 to provide redundancy. For example, each file ownership database 118 may include both the file and chunk entries for the files for which they are the owner node and the file and chunk entries for the files for which they are storing one or more data chunks. File ownership databases 118 may be further described with regard to file ownership datastores 200 and 260 in FIGS. 2a and 2b.

In some embodiments, data storage system 100 and/or various components thereof may include one or more processors, one or more types of memory, a display and/or other user interface components such as a keyboard, a touch screen display, a mouse, a track-pad, and/or any number of supplemental devices to add functionality. In some embodiments, data storage system 100 does not have a display and other user interface components and uses display and interface components from end user devices accessing data storage system 100.

Figure 2A:
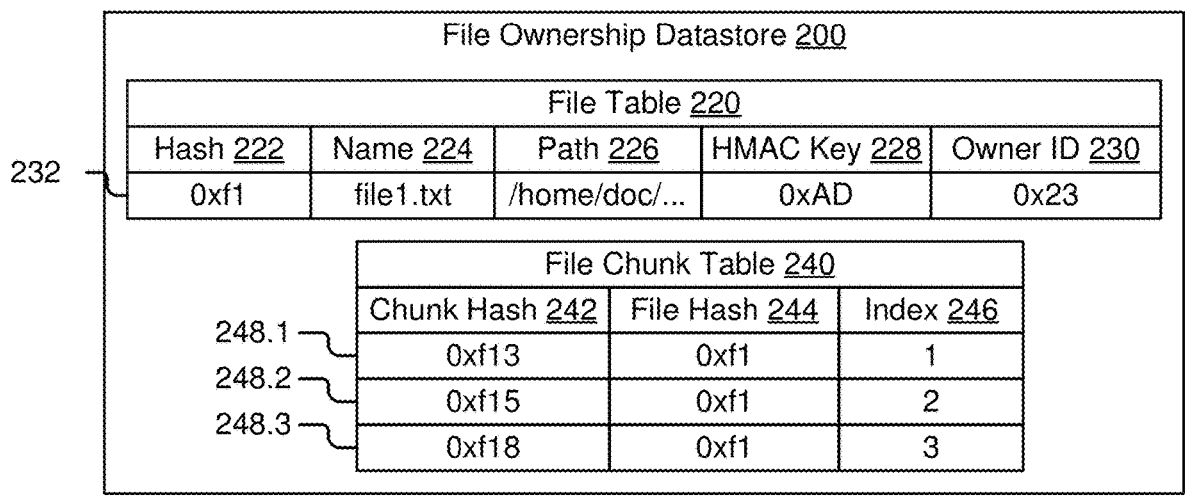
FIG. 2a schematically illustrates an example file ownership datastore to be distributed among NAS nodes.

FIG. 2a shows a schematic representations of an example file ownership datastore 200, such as may be used for data ownership databases 118 in FIG. 1. File ownership datastore 200 may include a file table 220 or similar data structure for organizing file entries 232 describing each file owned by a particular storage node. File ownership datastore 200 may include file chunk table 240 or similar data structure for organizing data chunk entries describing the data chunks corresponding to the files in file table 220. FIG. 2a shows entries for a single file and corresponding set of three chunks, but file ownership data store 200 may include any number of file entries and any number of corresponding data chunk entries describing the files owned by that storage node and, as further described below, the files for which it stores at least one data chunk.

File table 220 may be organized in a plurality of data fields corresponding to columns in the table. For example, file table 220 may include a file hash value 222, a file name value 224, a file storage path value 226, a hash-based message authentication code (HMAC) key, and a file owner identifier (ID) 230. File hash value 222 may include a hash value based on the file data to provide a unique hash value in the hash-based address space. For example, the file name may be hashed with the node internet protocol (IP) address using a secure hashing algorithm (e.g., SHA-512) to generate a unique file identifier value (e.g., 512 bit value) stored as file hash value 222. File name value 224 and file storage path value 226 may include the file name or object identifier used by the corresponding client system and file storage path used by the client system to store (and retrieve) the file. HMAC key 228 may include an HMAC access key value used to generate HMAC verification values for chunk retrieval verification for the file. Owner identifier 230 may include one or more unique identifier values for specific storage nodes, at least including a node identifier for the primary node that received the file and also including any additional storage nodes authorized to serve the file (secondary storage nodes, further described below). In some configurations, owner identifier 230 may be the unique node address value in the hash-based address space for that storage node. Each file entry 232 in file table 220 may correspond to a row of field values for a different file and file hash value 222 may provide a unique index value for the entries in file table 220.

File chunk table 240 may be organized in a plurality of data fields corresponding to columns in the table. For example, file chunk table 240 may include a chunk hash value 242, a file hash value 244, and an index value 246. Chunk hash value 242 may include a hash value based on the corresponding data chunk. For example, the shard of data corresponding to the data chunk may be hashed using the same secure hashing algorithm as the file and node address identifiers to generate a unique hash value for the data chunk in the hash-based address space. File hash value 244 may act as a file identifier for associating entries in file chunk table 240 with a corresponding file entry in file table 220. For example, the same file hash value 222 for the file may be used as file hash value 244 for each chunk entry 248.1-243.3 that makes up that file. Chunk index value 246 may include a series of ordinal values for the set of data chunks in the file to provide their order or relative positions in the original file for use in reassembling the file during retrieval/read operations. Each chunk entry 248 in chunk table 240 may correspond to a row of field values for a different data chunk and chunk hash value 242 may provide a unique index value for entries in chunk table 240.

Figure 2B:
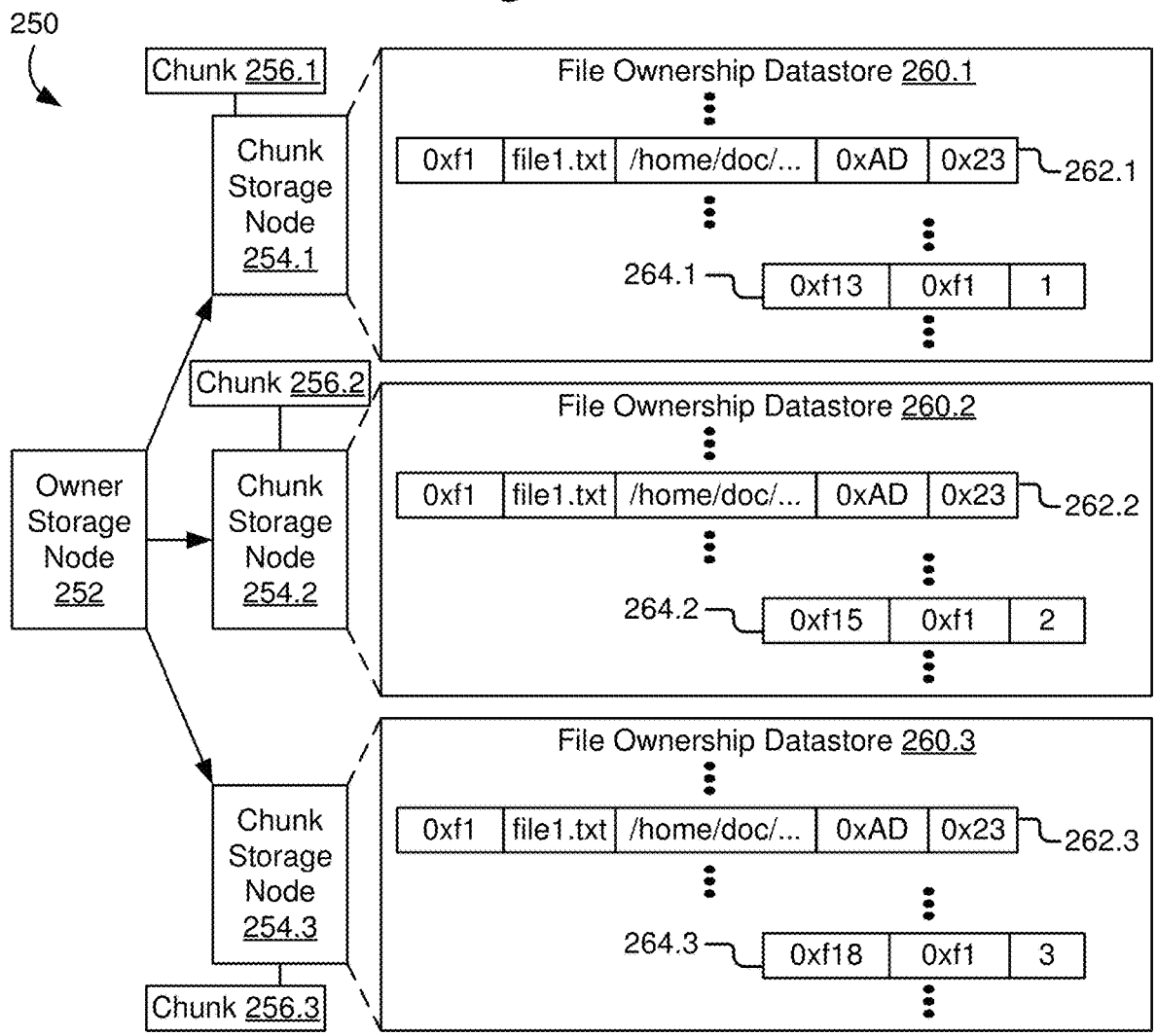
FIG. 2b schematically illustrates how an owner or primary storage node distributes data chunks and ownership data among file storage nodes.

In FIG. 2b, a diagram 250 of how ownership data may be distributed among the storage nodes, such as NAS nodes, receiving the data chunks for a particular file. File ownership datastore 200 may be the file ownership data for owner storage node 252 receiving file1txt from an associated client system. Owner storage node 252 may generate entry 232 based on the received file and then shard it into three corresponding data chunks 256.1, 256.2, and 256.3. Owner identifier 230 may indicate owner storage node 252 as the file owner using the hash-based node address value for owner storage node 252. Based on data chunks 256.1, 256.2, and 256.3, owner storage node 252 may generate entries 248.1-248.3 to uniquely identify those chunks, where they will be stored, and how they will be ordered to put them back together. File ownership datastore 200 may be stored by owner storage node 252 in non-volatile memory for use in retrieving and reassembling the file when it is requested by the client system.

Owner storage node 252 may then distribute the data chunks among the storage nodes in the node ring. For example, the data chunks may each be sent to the storage node with the next highest hash-based node address from the chunk hash value for that chunk. Based on the random, hash-based distribution of storage nodes in the hash-based address space and a similarly random hash-based distribution of data chunks based on their adjacency in the hash-based address space, data chunks 256 are randomly distributed (along with the data chunks from files received by any of the storage nodes in the ring). In some configurations, owner storage node 252 may not know the network address (e.g., IP address) or the hash-based node address of any of the storage nodes receiving data chunks 256, relying on routing through the node ring for the data chunks to find their target storage node. In some configurations, owner storage node 252 may send a handshake message through the storage ring to identify the target storage nodes and receive a message back with the node identifier and network address to assist in more directly routing the data chunks. Regardless, data chunks 256 may be received and stored in a non-volatile storage medium if their respective storage devices by the set of chunk storage nodes 254.1, 254.2, and 254.3.

Owner storage node 252 may also distribute copies of the ownership data for file1.txt to the set of chunk storage nodes 254.1, 254.2, and 254.3. In some configurations, the ownership data may be sent in a similar manner to the data chunks, based on their chunk hash value. If chunk storage nodes 254 respond with address information, that may assist with establishing peer-to-peer encryption for sending the ownership data in encrypted form. Each chunk storage node 254 may receive their copy of the ownership data and add the corresponding entries to their own file ownership datastore 260. For example, chunk storage node 254.1, storing data chunk 256.1, may receive file entry 262.1 for file1-txt and add it to its own file table. In some configurations, chunk storage node 254.1 may also receive some or all of the corresponding data chunk entries for the file, for example, chunk entry 264.1 for data chunk 256.1. In some configurations, the complete set of chunk entries for the file may be sent to and stored by each chunk storage node 254. Chunk storage node 254.2, storing data chunk 256.2, may receive and store file entry 262.2 and at least chunk entry 264.2 in file ownership datastore 260.2. Chunk storage node 254.3, storing data chunk 256.3, may receive and store file entry 262.3 and at least chunk entry 264.3 in file ownership datastore 260.3. In each case, the received ownership data may be inserted as entries in the corresponding tables in that storage node's file ownership datastore. Various methods for distribution and use of data chunks and ownership data may be further described below.

Figure 3:
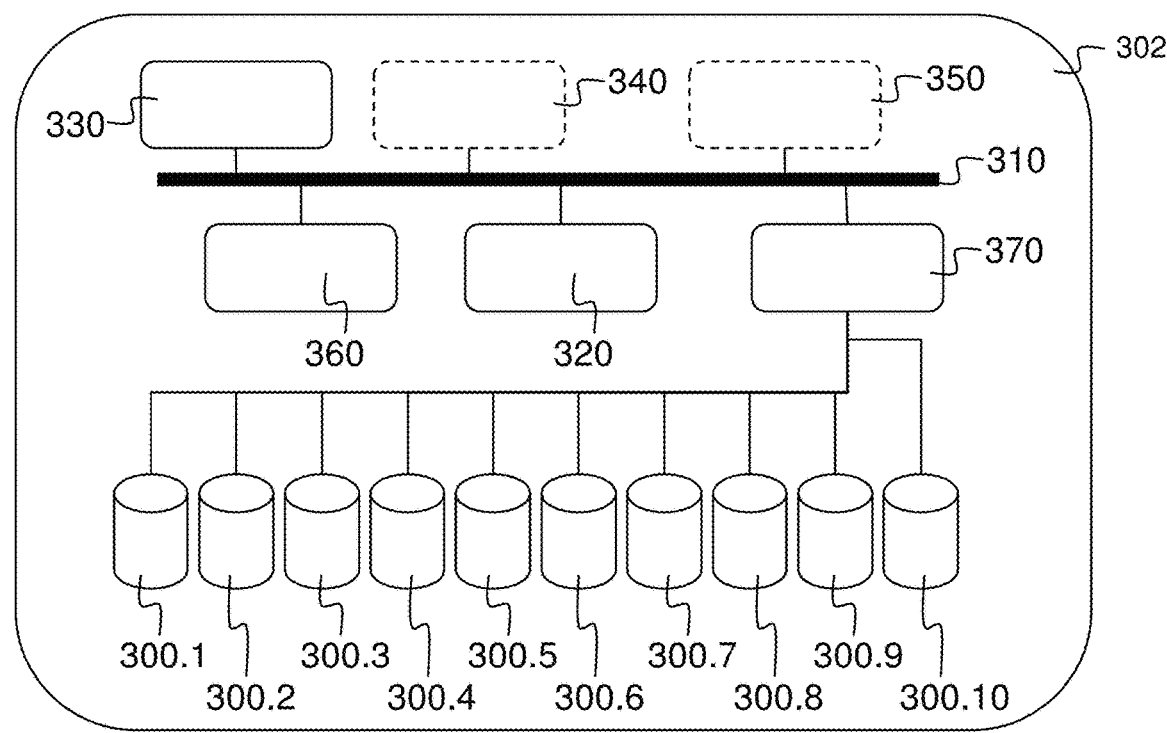
FIG. 3 schematically illustrates a storage node of the multi-device storage system of FIG. 1.

FIG. 3 shows a schematic representation of a storage node 302, such as NAS nodes 110. Storage node 302 may comprise a bus 310, a storage node processor 320, a storage node memory 330, one or more optional input units 340, one or more optional output units 350, a communication interface 360, a storage element interface 370 and a plurality of storage elements 300.1-300.10. In some embodiments, at least portions of bus 310, processor 320, local memory 330, communication interface 360, storage element interface 370 may comprise a host controller, storage controller, backplane management controller, network interface controller, or host bus interface controller, such as host controllers 112. Bus 310 may include one or more conductors that permit communication among the components of storage node 302. Processor 320 may include any type of conventional processor or microprocessor that interprets and executes instructions and may include multiple processors configured to operate alone or in combination. Local memory 330 may include a random-access memory (RAM) or another type of dynamic storage device that stores information and instructions for execution by processor 320 and/or a read only memory (ROM) or another type of static storage device that stores static information and instructions for use by processor 320. Input unit 340 may include one or more conventional mechanisms that permit an operator to input information to said storage node 302, such as a keyboard, a mouse, a pen, voice recognition and/or biometric mechanisms, etc. Output unit 350 may include one or more conventional mechanisms that output information to the operator, such as a display, a printer, a speaker, etc. Communication interface 360 may include any transceiver-like mechanism that enables storage node 302 to communicate with other devices and/or systems, for example mechanisms for communicating with other storage nodes 302 or client systems 120. Storage element interface 370 may comprise a storage interface, such as a Serial Advanced Technology Attachment (SATA) interface, a Small Computer System Interface (SCSI), peripheral computer interface express (PCIe), etc., for connecting bus 310 to one or more storage elements 300, such as one or more storage devices 114, to control the reading and writing of data to/from these storage elements 300.

Storage elements 300 may be configured as redundant or operate independently of one another. In some configurations, if one particular storage element 300 fails its function can easily be taken on by another storage element 300 in the storage system. Furthermore, the independent operation of the storage elements 300 allows to use any suitable mix of types storage elements 300 to be used in a particular storage node 302. It is possible to use for example storage elements with differing storage capacity, storage elements of differing manufacturers, using different hardware technology such as for example conventional hard disks and solid-state storage elements, using different storage interfaces, and so on. All this results in specific advantages for scalability and flexibility of storage system 100 as it allows to add or remove storage elements 300 without imposing specific requirements to their design in correlation to other storage elements 300 already in use in that storage system 100.

Figure 4:
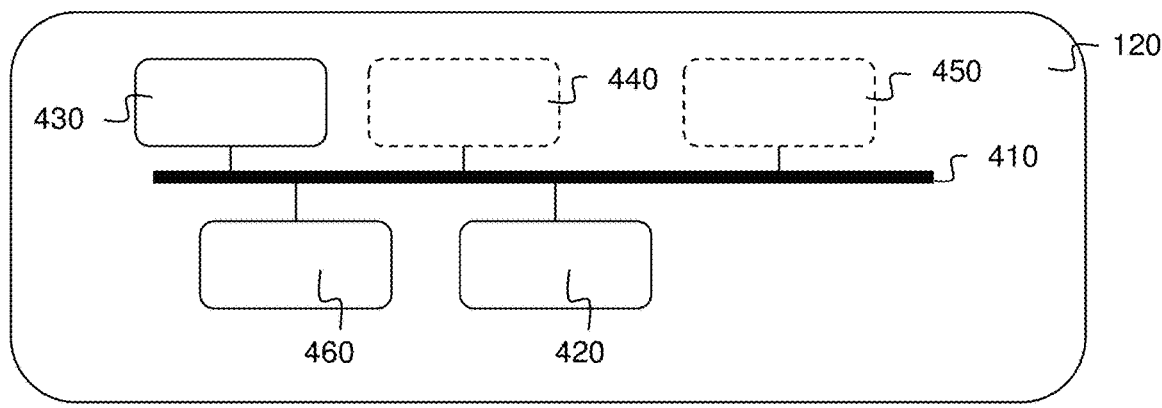
FIG. 4 schematically illustrates a host or client node of the multi-device storage system of FIG. 1.

FIG. 4 shows a schematic representation of an example client system 120. Client system 120 may comprise a bus 410, a processor 420, a local memory 430, one or more optional input units 440, one or more optional output units 450, and a communication interface 460. Bus 410 may include one or more conductors that permit communication among the components of client system 120. Processor 420 may include any type of conventional processor or microprocessor that interprets and executes instructions and may include multiple processors configured to operate alone or in combination. Local memory 430 may include a random access memory (RAM) or another type of dynamic storage device that stores information and instructions for execution by processor 420 and/or a read only memory (ROM) or another type of static storage device that stores static information and instructions for use by processor 420 and/or any suitable storage element such as a hard disk or a solid state storage element. An optional input unit 440 may include one or more conventional mechanisms that permit an operator to input information to client system 120 such as a keyboard, a mouse, a pen, voice recognition and/or biometric mechanisms, etc. Optional output unit 450 may include one or more conventional mechanisms that output information to the operator, such as a display, a printer, a speaker, etc. Communication interface 460 may include any transceiver-like mechanism that enables client system 120 to communicate with other devices and/or systems, such as storage nodes 302.

Figure 5:
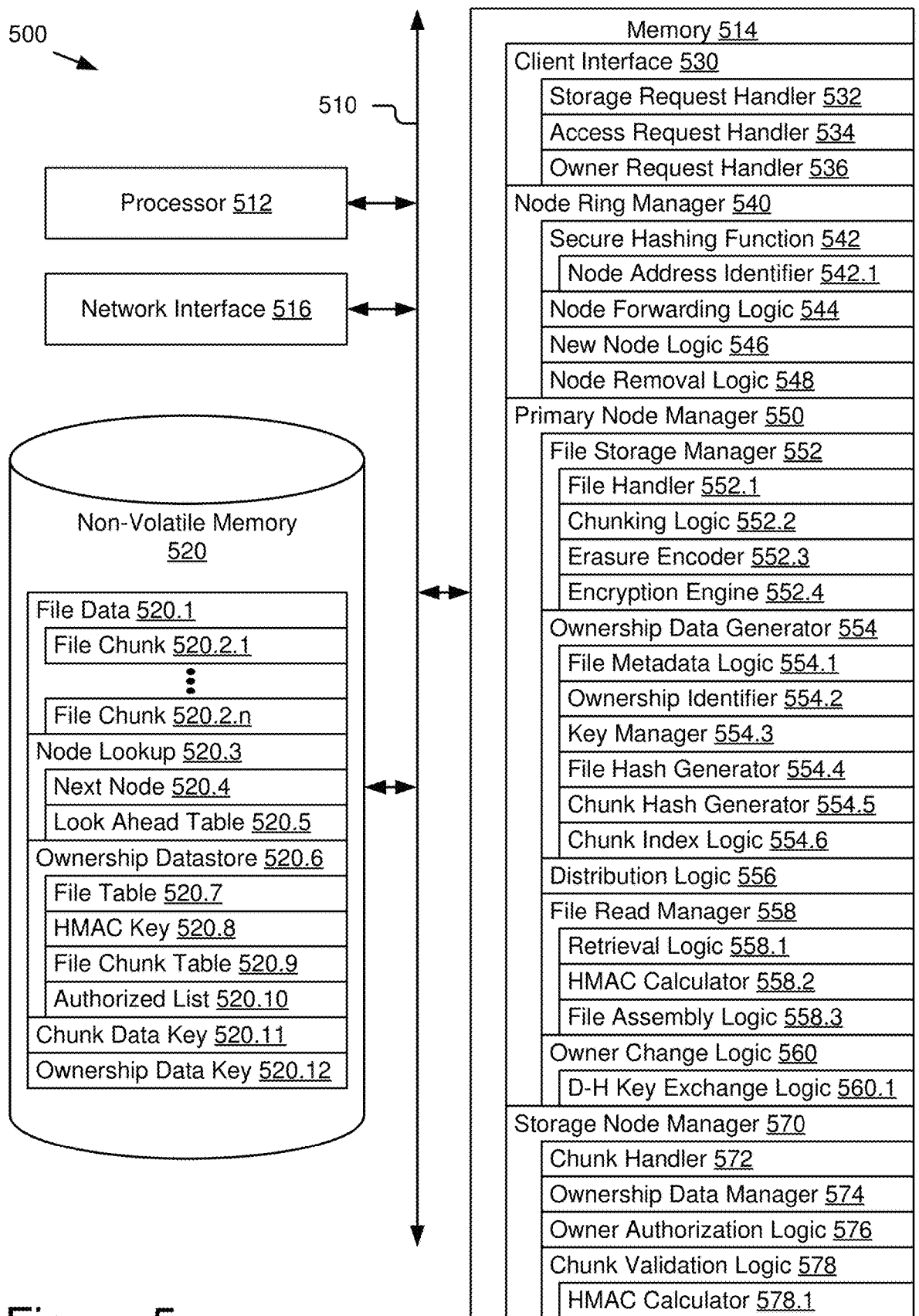
FIG. 5 schematically illustrates some elements of an example NAS node.

FIG. 5 schematically shows selected modules of a storage node configured for peer-to-peer file sharing using a node ring topology and consistent hashing to distribute ownership data for the files. Storage system 500 may incorporate elements and configurations similar to those shown in FIGS. 1-3. For example, storage system 500 may be configured in the host controller of NAS node comprising a set of data storage devices or similar storage elements. As shown, each storage node may include a client interface 530 and primary node manager 550 to enable the storage node to act as a primary or secondary owner node for any particular file, as well as a storage node manager 570 to act as a chunk storage node for files owned by another storage node.

Storage system 500 may include a bus 510 interconnecting at least one processor 512, at least one memory 514, and at least one interface, such as storage bus interface 516, network interface 517, and/or control bus interface 518. Bus 510 may include one or more conductors that permit communication among the components of storage system 500. Processor 512 may include any type of processor or microprocessor that interprets and executes instructions or operations and may include multiple processors that operate alone or in combination to execute those instructions or operations. Memory 514 may include a random access memory (RAM) or another type of dynamic storage device that stores information and instructions for execution by processor 512 and/or a read only memory (ROM) or another type of static storage device that stores static information and instructions for use by processor 512 and/or any suitable storage element such as a hard disk or a solid state storage element. In some configurations, non-volatile memory devices 520 may include storage controller memory devices supporting memory 514 and/or allocated for system use in one or more of the attached storage devices.

Network interface 516 may be used by storage system 500 to communicate with other storage nodes in the node ring and/or client systems using storage system 500 for storage operations. Network interface 516 may be a hardware component and/or a software module that provides a communication channel between storage system 500 and other systems, such as other storage nodes or client systems. Network interface 516 may support various network protocols, such as Ethernet, Fibre Channel, or InfiniBand, to facilitate the communication between storage system 500 and other systems. The choice of network protocol can depend on various factors, such as the network infrastructure, the performance requirements, and the compatibility with the client systems, the storage devices, and storage protocols. In some configurations, network interface 516 may include one or more ethernet interfaces configured for communication using internet protocols across a geographically distributed set of storage nodes.

Non-volatile memory 520 may include the non-volatile storage of the set of data storage devices or other storage elements in a storage node. For example, non-volatile memory 520 may include node and storage management data stored in a dedicated non-volatile storage device of the host controller or allocated within one or more administrative partitions of the data storage devices. The majority or all of the data storage device capacity in the set of data storage devices may be allocated to the storage of user data units. For example, non-volatile memory 520 may include file data 520.1 corresponding to client files and comprised of file chunks 520.1.1-$n$ corresponding to file shards distributed among the storage nodes.

Storage system 500 may include a plurality of modules or subsystems that are stored and/or instantiated in memory 514 for execution by processor 512 as instructions or operations. For example, memory 514 may include a client interface 530 configured to receive, process, and respond to storage and authorization requests from client systems. Memory 514 may include a node ring manager 540 configured to determine the storage node's location in the node ring and position relative to adjacent and forward storage nodes. Memory 514 may include a primary node manager 550 configured to manage client storage operations, including distribution and retrieval of client files distributed among the storage nodes in the node ring. Memory 514 may include a storage node manager 570 configured to manage the storage device storage operations for storing and retrieving file data 520.1. In some configurations, each storage node includes client interface 530, node ring manager 540, primary node manager 550, and storage node manager 570 to allow each node to act simultaneously as a client system interface, pass-through node, primary node for file management, and storage node for chunk storage.

Client interface 530 may include an interface protocol and/or set of functions and parameters for receiving, parsing, responding to, and otherwise managing requests from client devices, nodes, or systems. For example, client interface 530 may include functions for receiving and processing client storage requests to write or read client data files stored among the storage nodes of storage system 500. In some embodiments, client interface 530 may enable one or more storage protocols for user data units, such as files or data objects, over transmission control protocol/internet protocol (TCP/IP) interface protocols through network interface 516.

In some embodiments, client interface 530 may include a plurality of hardware and/or software modules configured to use processor 512 and memory 514 to handle or manage defined operations of client interface 530. Client interface 530 may include a storage request handler 532 configured to receive client storage requests. In some configurations, storage request handler 532 may include interfaces, functions, parameters, and/or data structures for receiving client storage commands for writing or storing user data units, such as files or data objects, to storage system 500 and the associated peer-to-peer storage node ring. Client interface 530 may include an access request handler 532 configured to receive client data access requests. In some configurations, access request handler 532 may include interfaces, functions, parameters, and/or data structures for receiving client storage commands for reading or retrieving user data units from storage system 500 and the associated peer-to-peer storage node ring. Client interface 530 may include an owner request handler 536 configured to receive client management requests related to authorizing access to client files and/or adding or moving ownership credentials between storage nodes. In some configurations, client interface 530 may be configured to receive, validate, and parse various client requests and forward them to primary node manager 550 for processing. Client interface 530 may comply with and enforce client interface protocols for interacting with storage system 500. In some configurations, this may include validation of specific client identification, authorization, and security protocols for accessing client data units stored to the system. Further description of security, authorization, and validation may relate to the data security and authorizations for accessing file and ownership data by specific storage nodes to complete the data distribution, recovery, and management functions of storage system 500 and may operate independent of the validation of user credentials and security protocols for returning those data units to a client system.

Node ring manager 540 may include logic and/or a set of functions, parameters, interfaces, and data structures for determining a storage node's position in the node ring relative to one or more adjacent storage nodes, as well as how peer messages are forwarded through the node ring. In some embodiments, node ring manager 540 may include a plurality of hardware and/or software modules configured to use processor 512 and memory 514 to handle or manage defined operations of node ring manager 540, such as secure hashing function 542, node forwarding logic 544, new node logic 546, and node removal logic 548.

Node ring manager 540 may include a secure hashing function 542 configured to define a hash-based address space that enables the logical organization of node and data relationships without the need for centralized management. In some configurations, each storage node is configured with the same secure hashing function, such as SHA-512, and corresponding logic to generate consistent hash-based identifiers in a common address space that is linear and ordinal. The ordered sequence of the address space may determine logically adjacent nodes, support wrapping from the highest value back to the lowest, and support unidirectional or bidirectional forwarding and adjacency logic. Each storage node may use secure hashing function 542 to generate a node address identifier 542.1 which is the hash-based identifier value for the node and its position in the node ring, such as a 512 bit node ring position.

Node ring manager 540 may include node forwarding logic 544 configured to forward peer messages through the node ring to a target storage node without knowing all of the storage nodes present in the node ring or even the node address identifier of the target storage node. For example, node forwarding logic 544 may be based on unidirectional travel through the node ring (generally in the direction of increasing values in the hash-based address space) and each storage node only needs to know the network address and node address identifier of the next storage node in the sequence. In some configurations, the logic for finding a target storage node may be based on traversing the node ring until the storage node with the next highest value of their node address identifier, relative to a chunk hash (in the same hash-based address space) of the data chunk being sent or retrieved. When a storage node receives a peer message with a chunk hash value for addressing, that storage node compares the hash value to their node address identifier 542.1 and, if the hash value is higher, then the message is forwarded to the next storage node based on a stored node lookup 520.3. Node lookup 520.3 may store one or more network address to node address identifier pairs. In some configurations, a network-node address pair for next node 520.4 may be all that is used for forwarding peer messages and messages move from node-to-node along the ring. In some configurations, node ring traversal may be accelerated by each node lookup 520.3 including a finger table or look ahead table 520.5 or similar data structure that includes a forward sequence of node pairs. Look ahead table 520.5 is not a complete table of network-node address pairs, which would become large and difficult to maintain, but configured to include only a sequential portion succeeding that node. The size of look ahead table 520.5 may be configured to balance table size and maintenance overhead with the peer message acceleration provided be "leaping" through the table. For example, each storage node N may include information about successor nodes N by $(2^i + N) \mod 2^m$, where $0 \leq I < m$. Each node stores routing information for at most m nodes in the network, because i is in the range of 0 to m. In some configurations, m may be selected based on the size of the address space, where the address space is $2^m$. So, for example, in a 4-bit address space with $2^4$ node addresses, each node would have a maximum number of m=4 nodes in look ahead table 520.5. When a chunk hash value is received, the storage node not only compares it to its own node address identifier, but also to each successor node in look ahead table 520.5 until one of those node address identifiers is greater than the chunk hash value. If such a node is in look ahead table 520.5, node forwarding logic 544 can forward the message directly to that node. If not, node forwarding logic 544 can forward the message to the last succeeding storage node in look ahead table 520.5, thus leaping a number of storage nodes equal to the number of nodes in the table minus one to accelerate finding the target node.

Node ring manager 540 may include new node logic 546 configured to respond to the addition of a new storage node in the vicinity of this storage node. For example, a new storage node may be inserted into the node ring based on a network address for any existing storage node in the ring. The new storage node may calculate its node address identifier 542.1 using secure hashing function 542 and use a peer message to locate the storage node with the next node address. Based on establishing communication with the next storage node, the new storage node may populate its node lookup data structure 520.3 and receive the prior storage node network-node address pair to locate itself for node ring traversal and enabling node forwarding logic 544. The new node may notify the prior node of its network-node address pair to update its node lookup data structure 520.3. In some configurations, the new storage node may also populate its look ahead table 520.5 based on the next storage node's lookup table and send a peer notification message around the node ring for prior storage node to update their look ahead tables. In response to being the next node to a new node, new node logic 546 may determine a subset of file data 520.1 and corresponding ownership data to transfer to the new node. For example, the node address identifier for the new storage node may now be the next highest hash value in the address space for one or more of file chunks 520.2 in the next storage node. The next storage node may identify those data chunks with chunk hash values below the node address identifier of the new storage node and transfer them to the new storage node. Note that there is no need to update any other storage nodes, including the owner nodes, of these changes in data chunk locations, since the owner storage nodes will use the chunk hash values for addressing any requests for those data chunks. Also note that, because file ownership is based on originating node, not file hash value, no ownership transfers are necessarily triggered by the addition of a new node. Because only the next storage node sends file chunks 520.2 and ownership data store 520.6 for the relocated file chunks to the new storage node, the node ring as a whole may not be substantially impacted by the addition and may ensure a constant time traffic disruption.

Node ring manager 540 may include node removal logic 548 configured to allow a storage node to withdraw from the node ring without disrupting operation of the overall operation of the system. For example, a storage node may determine that it is leaving the node ring, such as for decommissioning, maintenance, or allocation to another system. Node removal logic 548 may use next node 520.4 to determine the recipient of file data 520.1 and corresponding ownership data. Node removal logic 548 may notify the next storage node of the removal and forward file chunks 520.2 and ownership datastore 520.6. Because only the next storage node receives file chunks 520.2 and ownership data store 520.6, the node ring as a whole may not be substantially impacted by the departure and may ensure a constant time traffic disruption. In addition, node removal logic 548 may inform the prior storage node to change its next node (and otherwise modify node lookup 520.3). Note that management of the files for which the leaving storage node is the owner may be beyond the scope node removal logic 548 and should be managed by corresponding client systems prior to initiating removal of the storage node. Similarly, node removal logic 548 may not be directed to storage node failure or sudden removal of the storage node, which may require reconstruction of file data and ownership data based on redundancy in the erasure coding and/or redundant array of independent disk (RAID) configuration of the sharding of file data, as well as the redundant copies of ownership data distributed among the storage nodes storing the other data chunks.

Primary node manager 550 may include logic and/or a set of functions, parameters, interfaces, and data structures for managing operations as a data owner processing client requests and distributing and retrieving data chunks to support those requests. In some embodiments, primary node manager 550 may include a plurality of hardware and/or software modules configured to use processor 512 and memory 514 to handle or manage defined operations of primary node manager 550, such as a file storage manager 552, an ownership data generator 554, distribution logic 556, a file read manager 558, and owner change logic 560.

Primary node manager 550 may include file storage manager 552 configured to receive and store new user data units from client interface 530. For example, responsive to a client storage request, file storage manager 552 may process the incoming data file and distribute corresponding file chunks to a set of target storage nodes. A file handler 552.1 may receive the data unit from the client system through storage request handler 532. Chunking logic 552.2 may apply a sharding algorithm to divide the data unit into a plurality of data chunks. For example, chunking logic 552.2 may divide data files into chunk sizes optimized for efficient storage in the data storage devices (e.g., matched or a multiple of to the sector size of HDDs or erase block size of SSDs) and generate a set of data chunks corresponding to the file size divided by the chunk size. Erasure encoder 552.3 may apply erasure encoding to each data chunk to compensate for errors in data chunk storage and transmission. For example, a set of parity data may be calculated for each data chunk and added to that data chunk. In some configurations, file storage manager 552 may also apply a RAID configuration to determine chunk-level redundancy and/or corresponding parity chunks to enable recovery of data files if one or more data chunks are lost (such as failure or unavailability of a storage node) and/or reconstruction of a failed storage node from the data stored on other storage nodes. Encryption engine 552.4 may apply an encryption algorithm to each data chunk prior to distribution to other storage nodes. For example, encryption engine 552.4 may use advanced encryption standard (AES) encryption and a symmetric key, such as chunk data key 520.11, to encrypt each file chunk. The encrypted data chunks may then be distributed to other storage nodes by distribution logic 556. In some configurations, encryption engine 552.4 may also include corresponding decryption functions and may be invoked by file assembly logic 558.3 to decrypt data chunks during file reassembly.

Primary node manager 550 may include ownership data generator 554 configured to generate ownership data for use data units received through client interface 530. For example, ownership data generator 554 may process file metadata and/or chunk data to populate corresponding entries in ownership datastore 520.6. File metadata logic 554.1 may be configured to select file metadata to include in file entries in file table 520.7 for the client file. For example, file metadata logic 554.1 may select client file name or a similar data unit identifier (e.g., globally unique identifier (GUID) for data objects) and client storage path values (e.g., path identifiers corresponding to the directory structure of the file system used by the client system) to store in a corresponding file entry to assist in supporting client access requests. Ownership identifier 554.2 may add a unique identifier for the storage node receiving the storage request and acting as the initial owner of the user data unit. For example, ownership identifier 554.2 may use node address identifier 542.1 to identify the primary storage node as owner in the file entry in file table 520.7. Key manager 554.3 may select one or more access keys (encryption/decryption and/or validation keys) to be associated with the ownership data for the user data unit. For example, key manager 554.3 may generate or retrieve HMAC key 520.8 to be stored in the file entry in file table 520.7 for validating access to data chunks during data chunk retrieval. In some configurations, chunk data key 520.11 used by encryption engine 552.4 may also be included in the file entry in file table 520.7 by key manager 554.3.

Ownership data generator 554 may include a file hash generator 554.4 configured to use secure hashing function 542 to generate a file hash identifier in the hash-based address space of the node ring. For example, file hash generator 554.4 may use file metadata, such as the file name or other data unit identifier, as an input to secure hashing function 542 to determine the unique file hash identifier for that client file that may be stored in the file entry for that file. A chunk hash generator 554.5 may be configured to use secure hashing function 542 to generate a chunk hash identifier in the hash-based address space of the node ring. For example, chunk hash generator 554.5 may use the file chunk data as an input to secure hashing function 542 to determine a unique chunk hash that acts as both a unique identifier for the data chunk and addressing for distributing the data chunk to a target storage node with the next highest node address identifier in the node ring. Chunk index logic 554.6 may be configured to assign index values that describe the arrangement of the data chunks for reassembling the user data unit. For example, based on chunking logic 552.2 the data chunks may correspond to a chunk sequence in the original data unit and the index values may be an ordered list of values that define that data chunk's position in the ordered chunk sequence. Ownership data generator 554 may store a chunk entry for each data chunk in file chunk table 520.9. For example, each chunk entry may include the chunk hash identifier, the file hash identifier, and the chunk index value for that data chunk.

Primary node manager 550 may include distribution logic 556 configured to distribute the data chunks through the node ring to other storage nodes for storage in their respective data storage devices. For example, distribution logic 556 may receive the data chunks from file storage manager 552 and use the chunk hash values generated by ownership data generator 554 to send peer messages through the node ring to distribute the data chunks to target storage nodes. In some configurations, distribution logic 556 may send an initial peer message for each data chunk to identify the corresponding set of target storage nodes and receive their network address information for sending the corresponding data chunks and ownership data. In some configurations, distribution logic 556 may initiate secure data transfer between the primary node and each target storage node to protect ownership data in transit. For example, distribution logic 556 may use Diffie-Hellman key exchange logic 560.1 as described below for owner change logic 560 for asymmetric key exchange of ownership data key 520.12. Note that, once distribution of chunk data and ownership data is complete, primary node manager 550 does not retain the network address information for the target storage nodes, as those nodes may change without notice to the primary storage node.

Primary node manager 550 may include file read manager 558 configured to execute data chunk retrieval and use data unit reassembly for client access requests. For example, when primary node manager 550 receives a client access request from client interface 530, file read manager 558 may be initiated to fulfill the read operation for the requested client file. Retrieval logic 558.1 may include logic for identifying the file chunks corresponding to the file from ownership datastore 520.6 and sending retrieval request messages through the node ring for the data chunks. For example, retrieval logic 558.1 may determine the file hash identifier from file metadata in the access request and use it to index file table 520.7 and file chunk table 520.9 to retrieve the corresponding file entry and data chunk entries. Retrieval logic 558.1 may then send file chunk retrieval messages to the target storage nodes based on the chunk hash identifiers from the data chunk entries. In some configurations, chunk retrieval may include a series of messages to establish network address communication, validate ownership authorization, and validate data chunk access using an HMAC exchange. For example, both the primary node and each storage node may determine an HMAC value based on hashing, using an HMAC algorithm, the chunk hash value with the HMAC key from the file entry through HMAC calculator 558.2. Each storage node may compare the HMAC values before returning the corresponding data chunk. In some configurations, the storage nodes may also validate ownership based on node address identifier 542.1 matching the node address identifier in the owner identifier field of the corresponding file entry. File read manager 558 may receive the set of data chunks from the target storage nodes. File assembly logic 558.3 may process the set of data chunks to restore the original use data unit. For example, file assembly logic 558.3 may use the index values from the chunk entries and chunk data key 520.11 to reverse the functions of encryption engine 552.4, erasure encoder 552.3, and chunking logic 552.2 to return the original data unit. File assembly logic 558.3 may include or access a corresponding decryption engine and erasure decoder.

Primary node manager 550 may include owner change logic 560 configured to enable ownership of user data units initially received and owned by the primary storage node to enable additional storage nodes as secondary owner nodes or to transfer file ownership to another storage node. For example, owner change logic 560 may respond to owner change requests received by owner request handler 536 to migrate ownership data to the secondary storage node and notify the storage nodes with the corresponding data chunks to update their ownership data for the new or additional owner. In some configurations, the primary storage node may initiate key exchange with the secondary storage node to transfer ownership data key 520.12 for secure transfer of the ownership data. For example, Diffie-Hellman key exchange logic 560.1 may be used for asymmetric key exchange between storage nodes as further described below. Once ownership data has been transferred to the secondary storage node, owner change logic 560 may initiate owner update messages through the node ring to each target storage node storing data chunks for that client file. For example, owner update messages may be addressed using the chunk hash values from ownership datastore 520.6 and include the new ownership identifier to be added to authorized list 520.11 for the file. Authorized list 520.10 may be a list of ownership identifiers in the owner identifier field of the file entry, starting with the primary owner. If ownership is being transferred, the owner update message may also instruct removal of the owner identifier of the prior primary storage node. The primary and secondary nodes may make corresponding modifications to their own file entries in their respective ownership datastores.

Storage node manager 570 may include logic and/or a set of functions, parameters, interfaces, and data structures for managing operations as a storage node receiving data chunks and corresponding ownership data for distributed storage in the node ring, as well as responding to retrieval requests for those data chunks. In some embodiments, storage node manager 570 may include a plurality of hardware and/or software modules configured to use processor 512 and memory 514 to handle or manage defined operations of storage node manager 570, such as a chunk handler 572, an ownership data manager 574, owner authorization logic 576, and chunk validation logic 578.

Storage node manager 570 may include chunk handler 572 configured to receive and store data chunks for user data units owned by other storage nodes. For example, the file storage manager 552 in the owner storage node sends the data chunks to target storage nodes based on their corresponding chunk hash identifiers, node forwarding logic of intervening storage nodes forwards the data chunks (or a peer message for establishing network address communication) until it is received by the target storage node with the next highest node address identifier from the chunk hash identifier, and chunk handler 572 writes the received data chunk to the non-volatile storage medium of one or more of its data storage devices. Ownership data manager 574 may be similarly configured to receive the ownership data corresponding to the data chunk from the owner node and store it to its ownership datastore 520.6. For example, ownership data manager 574 may parse a file entry and set of data chunk entries for the file from the received ownership data messages and insert them into its respective file table 520.7 and file chunk table 520.9. As discussed elsewhere, the process of receiving data chunk and ownership data may include a sequence of peer messages, exchange of network addresses between owner and storage nodes, establishing secure communication based on exchange of encryption keys, such as Diffie-Hellman key exchange logic 560.1, and one or more storage and/or metadata operation messages. Chunk handler 572 and ownership data manager 574 may also be configured to access data chunks and ownership data in response to data chunk retrieval requests. For example, after data chunks and ownership data are received and stored, the owner storage node may need to retrieve one or more data chunks for responding to a client access request and send a corresponding data chunk retrieval request to the corresponding set of target storage nodes.

Storage node manager 570 may include owner authorization logic 576 and chunk validation logic 578 may be configured to support chunk retrieval requests and assure that the correct data chunk is returned only to an authorized owner (which could be the primary or original owner or another storage node that has since been authorized as a secondary node). For example, responsive to an initial peer message with a chunk retrieval request, owner authorization logic 576 may retrieve, from the storage node's ownership datastore, the file entry corresponding to the file hash identifier in the request. The file entry may include or reference authorized list 520.10 of ownership identifiers that have been given ownership access to this file. For example, the original file entry received from the owner node may have included the node address identifier for that primary node, which was the original authorized list 520.11. If one or more ownership changes have occurred since that time, ownership data manager 574 may have appended additional secondary ownership identifiers to authorized list 520.10 for that file entry. Owner authorization logic 576 may compare the ownership identifier (e.g., node address identifier) from the received request to the list of ownership identifiers in authorized list 520.10 to determine whether any of the stored ownership identifiers match. If so, the requesting storage node is authorized and storage node manager 570 may return an authorization message, such as a message including the network address for the storage node to assist un further communication and transfer of the data chunk. If no match is found in authorized list 520.10, then an error or denial message may be returned to the requesting storage node.

Chunk validation logic 578 may provide an additional layer of security and data verification by requiring that the requesting storage node and the data chunk storage node validate an HMAC specific to the data chunk prior to returning the data chunk. For example, chunk validation logic 578 may use ownership data manager 574 to retrieve the HMAC key associated with the file entry and the chunk hash identifier stored in the chunk entry. Using the HMAC key to process the chunk hash identifier through HMAC calculator 578.1, chunk validation logic 578 may calculate a unique message authentication code value for the data chunk. In parallel, the requesting storage node may access the ownership data it has stored for the client file and retrieve the corresponding HMAC key from the file entry and chunk hash identifier from the chunk entry. File read manager 558 of the requesting storage node may have a similar HMAC calculator 558.2 for calculating the unique message authentication code value and the version of that value calculated by the requesting storage node may be sent to the data chunk storage node. Chunk validation logic 578 may then compare the internally calculated unique message authentication code value to the received unique message authentication code value for the data chunk to determine whether both nodes have calculated the same value. If the values match, chunk handler 572 may retrieve and return the data chunk to the requesting storage node. If the values do not match, an error message may be generated and returned to the requesting storage node.

Figure 6A:
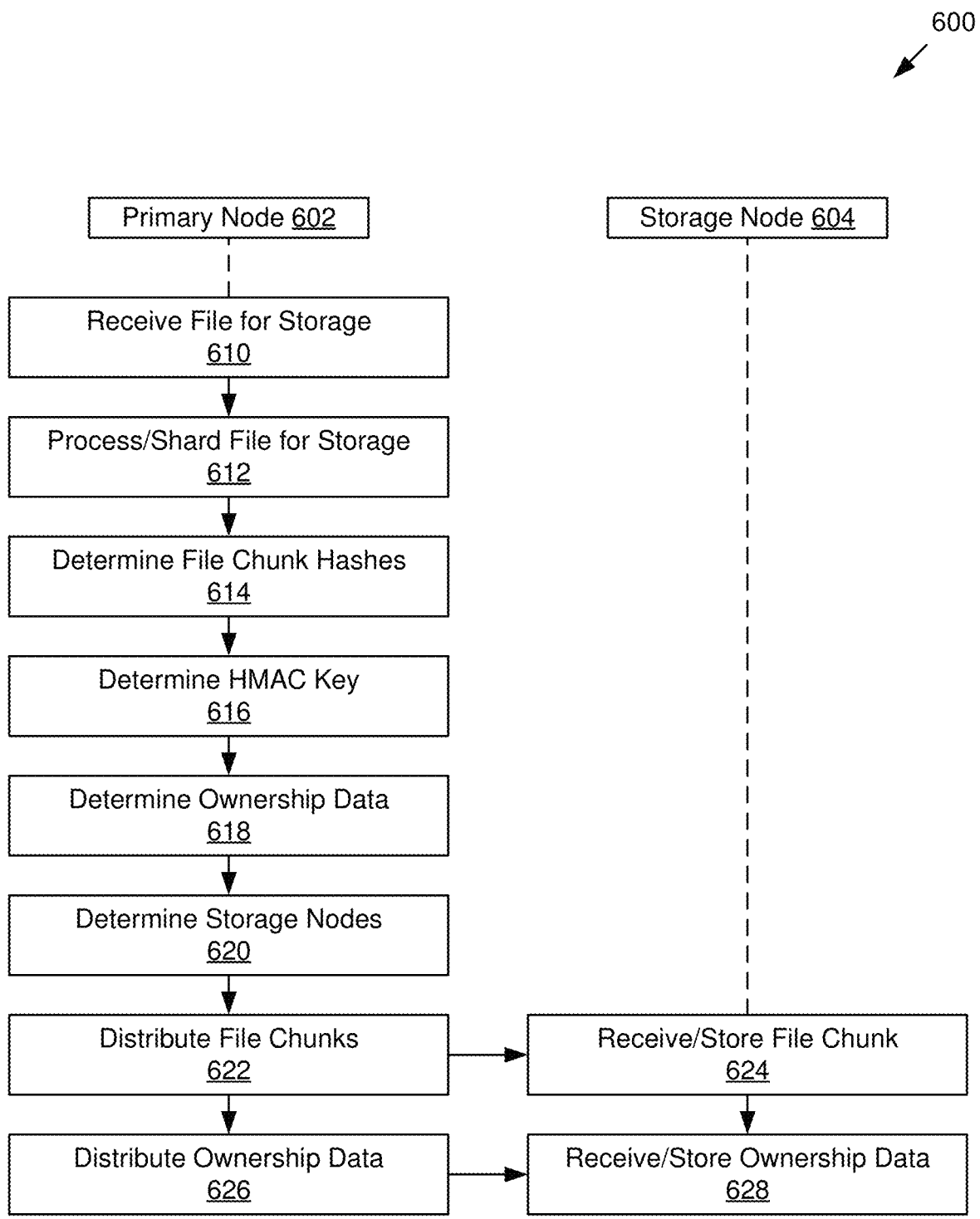
FIG. 6a is a flowchart of an example method of storing a file to the NAS nodes.

As shown in FIG. 6a, storage system 500 may be operated according to an example method for storing user data units distributed among storage nodes in the node ring, i.e., according to method 600 illustrated by blocks 610-628 in FIG. 6a. In some configurations, a storage node operating as a primary node 602 may execute the blocks on the left and each target storage node storing a data chunk may execute the blocks on the right.

At block 610, a file may be received for storage. For example, the primary node may receive a client storage request with a client file for storage.

At block 612, the file may be processed and sharded for storage. For example, the primary node may divide the file into a plurality of data chunks, as well as erasure encode and encrypt those data chunks.

At block 614, file chunk hashes may be determined. For example, the primary node may calculate a chunk hash identifier from the file chunk data for each data chunk.

At block 616, an HMAC key may be determined. For example, the primary node may generate or retrieve an HMAC key for the file to be used for chunk validation during data retrieval.

At block 618, ownership data may be determined. For example, the primary node may determine file metadata for the file and data chunk metadata for each data chunk.

At block 620, storage nodes may be determined. For example, the primary node may use the chunk hash identifier for each chunk hash to address peer messages through the node ring to determine target storage nodes to receive each data chunk.

At block 622, the file chunks may be distributed. For example, the primary node may send the data chunks to the set of target storage nodes.

At block 624, the file chunks may be received and stored by the corresponding storage nodes. For example, each storage node may receive its corresponding data chunk and store it to its data storage devices.

At block 626, ownership data may be distributed. For example, the primary node may send the ownership data corresponding to the file to each target storage node.

At block 628, the ownership data may be received and stored by the corresponding storage nodes. For example, each storage mode may receive the ownership data for the client file and store it to its ownership datastore.

Figure 6B:
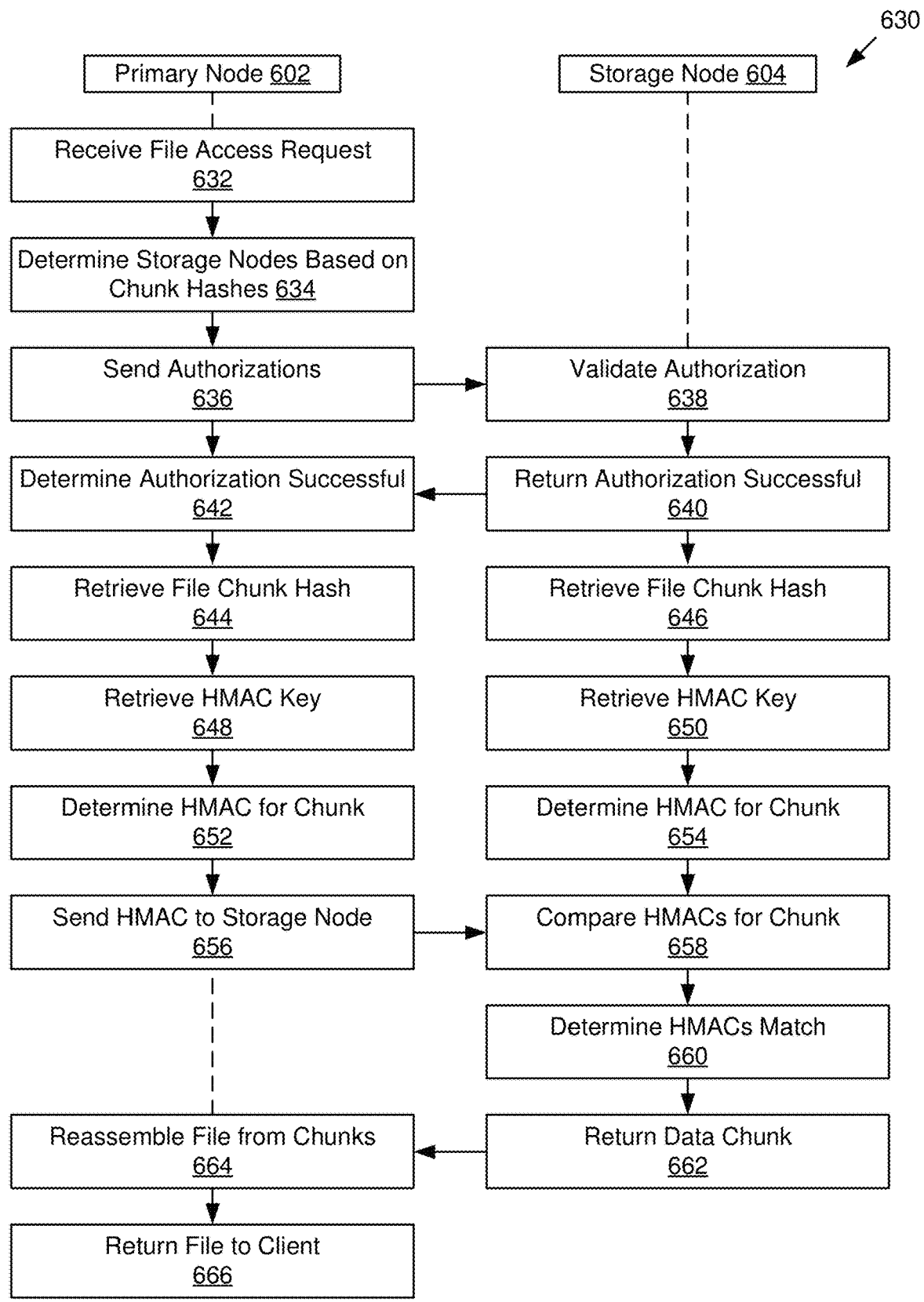
FIG. 6b is a flowchart of an example method of responding to a file request by the NAS nodes.

As shown in FIG. 6b, storage system 500 may be operated according to an example method for retrieving user data units distributed among storage nodes in the node ring, i.e., according to method 630 illustrated by blocks 632-666 in FIG. 6b. In some configurations, a storage node operating as a primary node 602 may execute the blocks on the left and each target storage node storing a data chunk may execute the blocks on the right.

At block 632, a file access request may be received for a client file. For example, the primary node may receive a client access request for a previously stored client file.

At block 634, target storage nodes may be determined based on chunk hashes. For example, the primary node may access the set of chunk hash identifiers stored in the ownership data for the client file and use those chunk hash identifier to locate the storage nodes storing each data chunk in the node ring.

At block 636, owner authorizations are sent to target storage nodes. For example, the primary node may send authorization messages to the set of target storage nodes indicating the ownership identifier of the primary node.

At block 638, the target storage nodes may validate owner authorization. For example, the storage nodes may retrieve one or more ownership identifiers for the file from previously stored ownership data and compare them to the ownership identifier in the authorization message.

At block 640, the target storage nodes may return authorization successful messages. For example, if the received ownership identifier matches an ownership identifier in the authorized list for the file, that storage node may return an authorization successful message to the primary node.

At block 642, authorization may be determined to be successful. For example, the primary node may receive authorization successful messages from all of the target storage nodes.

At blocks 644 and 646, file chunk hashes may be retrieved from respective ownership data. For example, both the primary node and the storage nodes may retrieve the corresponding file chunk hashes for the file from previously stored ownership data (the primary node may retrieve for all data chunks, while each storage node may retrieve only the chunk hash for the data chunk it stores).

At blocks 648 and 650, HMAC keys may be retrieved. For example, both the primary node and the storage modes may retrieve the HMAC key for the file from previously stored ownership data.

At block 652 and 654, HMAC values may be determined for the chunks. For example, the primary node and the storage nodes may independently calculate HMAC values for the corresponding data chunks based on the chunk hash data and HMAC key.

At block 656, the HMAC values may be sent to the target storage nodes. For example, the primary node may send the HMAC value that it calculated for each data chunk to the corresponding target storage node storing that data chunk.

At block 658, the HMAC values may be received and compared. For example, each target storage mode may receive the corresponding HMAC value and compare it to the HMAC value that storage node calculated for that data chunk.

At block 660, the HMAC values may be determined to match. For example, each target storage node may determine that their calculated HMAC value matches the HMAC value received from the primary node.

At block 662, the data chunks may be returned. For example, each target storage mode may return their respective data chunks for the file to the primary storage node.

At block 664, the data chunks may be reassembled into the client file. For example, the primary node may reverse the sharding process, as well as decrypt any encryption and remove any erasure coding, to reassemble the original client file that was received for storage.

At block 666, the file may be returned to the client. For example, the primary node may return the requested client file to the requesting client system.

Figure 6C:
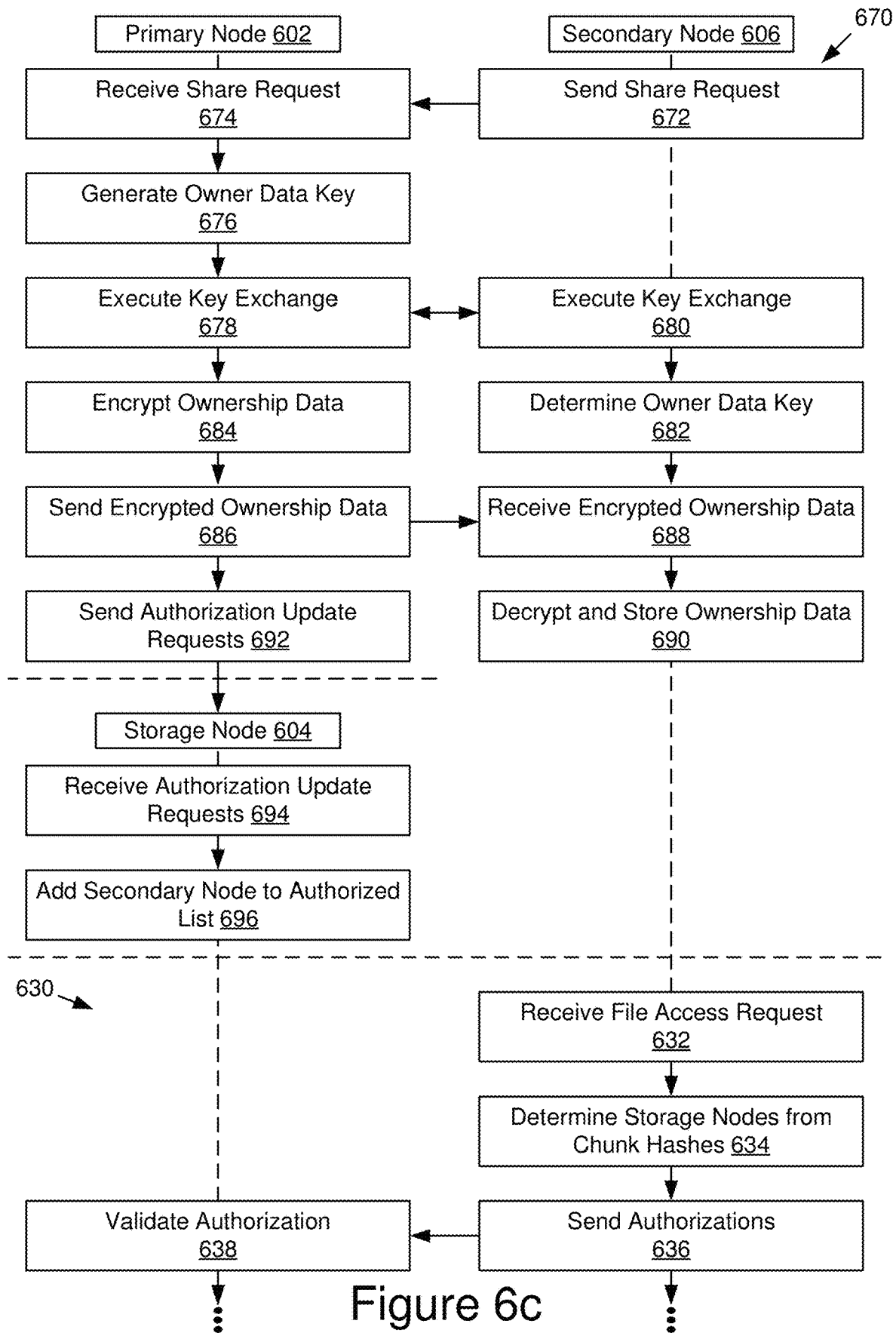
FIG. 6c is a flowchart of an example method of adding or transferring ownership of a stored file between NAS nodes.

As shown in FIG. 6c, storage system 500 may be operated according to an example method for transferring ownership among storage nodes in the node ring, i.e., according to method 670 illustrated by blocks 672-696 in FIG. 6c. In some configurations, a storage node operating as a primary node 602 may execute the blocks on the left and a storage node operating as a secondary node 606 to receive the ownership may execute the blocks on the right for a first portion of the method through block 692, then the storage nodes 604 storing the data chunks for the file may execute blocks 694-696. Method 670 may support execution of method 630 (from FIG. 6b) by storage nodes 606 and secondary node 606 acting as a new primary node following the transfer of ownership.

At block 672, a file share request may be sent. For example, a client system may authorize a sharing or transfer of ownership of one or more client files by sending a file share request through the secondary node or directly to the primary node.

At block 674, a file share request may be received for a client file. For example, the primary node may receive a file share request for a previously stored client file.

At block 676, an owner data key may be generated. For example, the primary node may generate or receive a private-public key pair for use in securing transfer of ownership data.

At blocks 678 and 680, secure key exchange may be executed. For example, the primary node and the secondary node may use Diffie-Hellman key exchange such that both nodes have the same owner data key for encrypting and decrypting ownership data.

At block 682, the owner data key is determined by the secondary node. For example, as a result of the key exchange, the secondary node may store the owner data key.

At block 684, the ownership data may be encrypted using the owner data key. For example, the primary node may retrieve the ownership data corresponding to the file from its ownership datastore and encrypt it using the owner data key.

At block 686, the encrypted ownership data may be sent. For example, the primary node may send the encrypted ownership data to the secondary node.

At block 688, the encrypted ownership data may be received. For example, the secondary node may receive the encrypted ownership data from the primary node.

At block 690, the ownership data may be decrypted and stored. For example, the secondary node may use the owner data key to decrypt the ownership data and store it in its ownership datastore.

At block 692, authorization update requests may be sent. For example, the primary node may send, using peer messages through the node ring, authorization update requests with the new ownership identifier for the secondary node to each of the storage nodes with a data chunk for the file.

At block 694, authorization update requests may be received by the storage nodes. For example, each storage node storing a data chunk for the file may receive the new ownership identifier from the peer message.

At block 696, the secondary node may be added to the authorized list for the file. For example, each storage node may store the ownership identifier for the secondary node in the ownership data for that client file.

The secondary node may now operate like a primary node for serving the file in response to client access requests. Secondary node 606 may replace primary node 602 in method 630 in FIG. 6b for complete client access requests, starting at block 632.

Figure 7A:
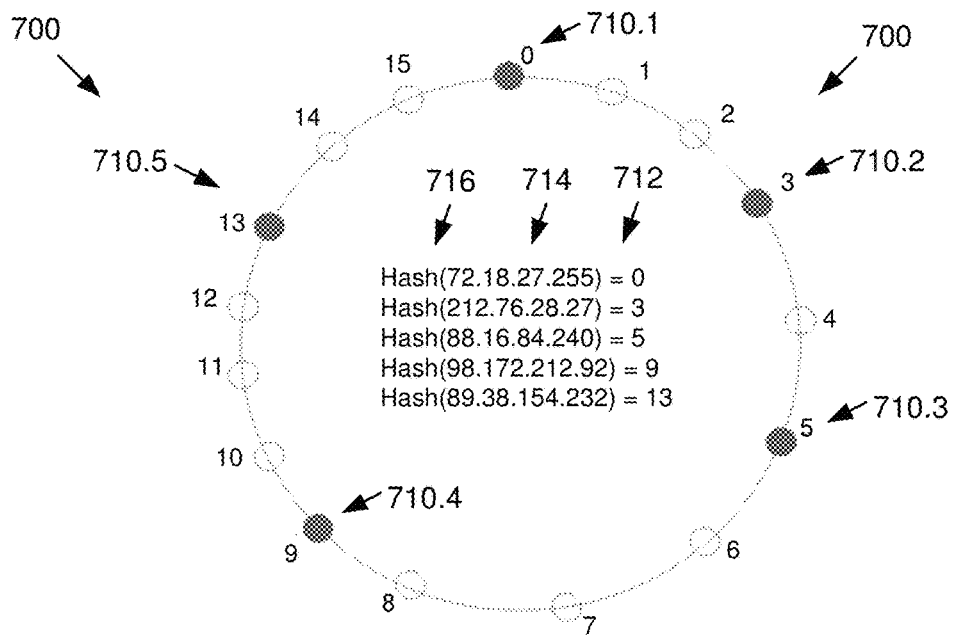
FIG. 7a schematically illustrates an example node ring with a hash-based address space.

FIGS. 7a-7e show an example set of storage nodes in a node ring 700. In the example shown, a small hash-based address space of only 16 possible addresses (4-bit address space=$2^4$=16) is shown with address values of 0-15. Note that the actual address space used for a storage system would be orders of magnitude larger than the number of possible nodes and files in the ring to render address collisions statistically unlikely. In FIG. 7a, five storage nodes 710.1-5 are present in the address space and have a hash-based address identifier 712. Each storage node has had its network address 714 (e.g., IP address) hashed through a consistent hashing function 716 to determine the unique address of that storage node. For example, storage node 710.1 has an IP address of 72.18.27.255 that is hashed into a hash address identifier of 0, storage node 710.2 has an IP address of 212.76.28.27 that is hashed into a hash address identifier of 3, and so on.

Figures 7B, 7C:
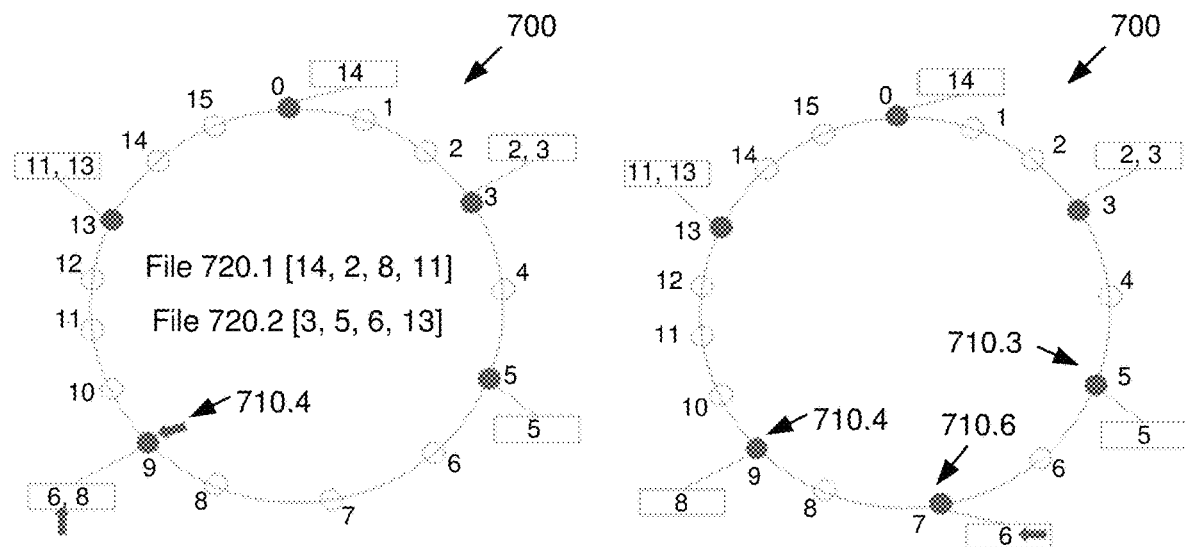
FIG. 7b schematically illustrates an example node ring with file chunks distributed among the NAS nodes.
FIG. 7c schematically illustrates an example node ring with a new NAS node being added to the node ring.

In FIG. 7b, two sets of data chunks for a file are distributed through the node ring based on their chunk hash identifiers. For example, file 720.1 may be sharded into four data chunks with chunk hash identifiers of 14, 2, 8, and 11 and file 720.2 may be sharded into four data chunks with chunk hash identifiers of 3, 5, 6, and 13. These chunks may be distributed to storage nodes around the node ring based on targeting the storage node with the next highest address value to the chunk hash identifier. In the example shows, chunk hash values equal to the node address identifier are assigned to that storage node, but in an actual implementation the address space would be large enough that exact value matches are highly unlikely. For file 720.1, the data chunks are distributed to storage nodes 710.1, 710.2, 710.4, and 710.5 based on hash address identifier 0 being the next "largest" from chunk hash 14 based on wrapping the address space (so 0 follows 15), hash address identifier 3 being the next largest from chank hash 2, hash address identifier 9 being the next largest from chunk hash 8, and hash address identifier 13 being the next largest from chunk hash 11. For file 720.2, the data chunks are distributed to storage nodes 710.2, 710.3, 710.4, and 710.5 based on hash address identifier 3 being the next largest (or equal) from chunk hash 3, hash address identifier 5 being the next largest (or equal) from chank hash 5, hash address identifier 9 being the next largest from chunk hash 6, and hash address identifier 13 being the next largest (or equal) from chunk hash 13.

In FIG. 7c, a new storage node 710.6 is inserted into node ring 700. As a result, adjacent node 710.4 may need to determine whether any data chunks should be transferred to node 710.6 so that they may be properly located based on their chunk hash identifier. Storage node 710.4 may receive notification of new storage node 710.6 and its hash address identifier of 7. Storage node 710.4 may compare the new hash address identifier (7) to the chunk hashes it currently stores (chunk hashes 6 and 8 in FIG. 7b) and determine that chunk hash 6 is less than hash address identifier 7 and should be transferred to new storage node 710.6. Once chunk hash 6 and the corresponding ownership data is transferred to new storage node 710.6, peer messages directed to chunk hash 6 will correctly arrive at storage node 710.6, where it is now stored. Note that a notification message may also be sent to storage node 710.3 so that it updates its next node for peer message forwarding to the IP address for 710.6.

Figure 7D:
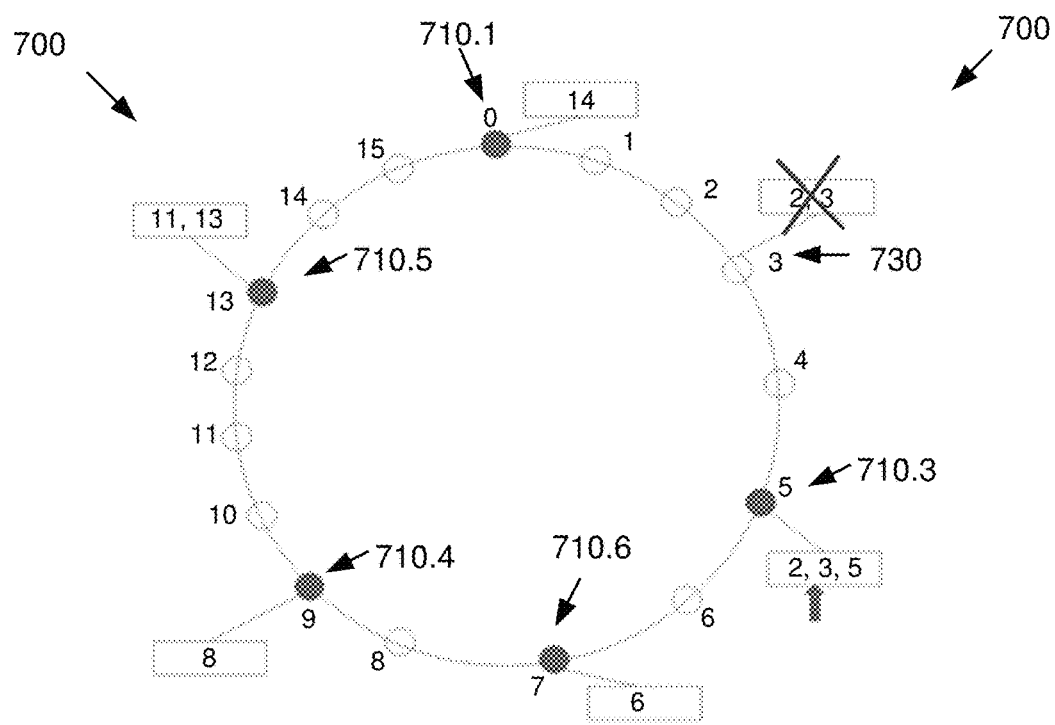
FIG. 7d schematically illustrates an example node ring with a NAS node being removed from the node ring.

In FIG. 7d, storage node 710.2 leaves node ring 700 at hash address identifier 3 730. Prior to leaving node ring 700, storage 710.2 may identify the next storage node in the node ring, or storage node 710.3 at hash address identifier 5. All of the data chunks (corresponding to chunk hashes 2 and 3) and corresponding ownership data in storage node 710.2 may be transferred to storage node 710.3 and will continue to be available and locatable through peer messages in node ring 700. Next node information would also be updated for storage node 710.1.

Figure 7E:
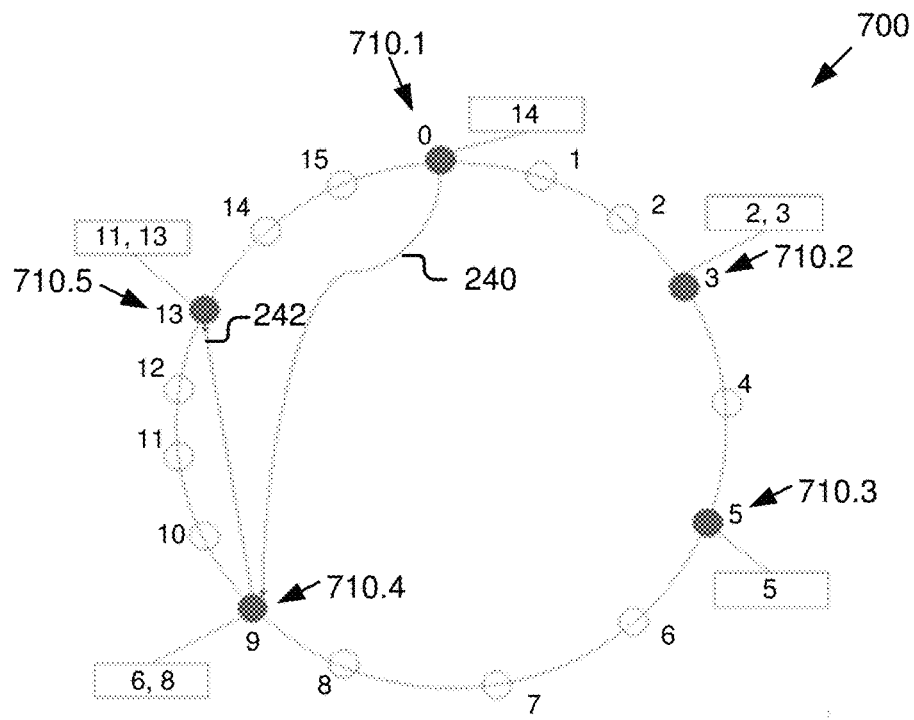
FIG. 7e schematically illustrates an example node ring with improved node location based on partial hash-based node lookup tables.

FIG. 7e shows how node look ahead or finger tables may be used to shorten the path to locating a target storage node through the node ring. As an initial example, a peer message may simply be forwarded through the address space from one storage node to the next storage node in the order of their hash address identifiers. For example, a peer message from storage node 710.1 that is addressed based on chunk hash 11 would go to storage node 710.2 to storage node 710.3 to storage node 710.4 and stop at storage node 710.5 based upon arriving at a hash address identifier 13 that is greater than the target chunk hash in a system where each storage node only knows the address of the next storage node. In some configurations, each node may contain information about more than just one successor node. For example, each node N may contain information about each successor node which succeeds node N by $(2^i+N) \mod 2^m$, where $0 \leq i < m$. Each node may store a portion of the routing information about at most m nodes in node ring 700, because i is in the range of 0 to m. In an example where m=4 for a 4 bit address space, the look ahead table for storage node 710.1, N=0. For i=0 and i=1, the target hash address values would be $(2^0+0) \mod 2^4=1$ and $(2^1+0) \mod 2^4=2$, both of which would map to storage node 710.2 with hash address identifier 3 as the next highest address. For i=2, the target hash address value would be $(2^2+0) \mod 2^4=4$, which would map to storage node 710.3 with hash address identifier 5. For i=3, the target hash address value would be $(2^3+0) \mod 2^4=8$, which would map to storage node 710.4 with hash address identifier 9. So, the resulting look ahead or finger table would include hash address identifier to network identifier mapping pairs for storage nodes 710.2, 710.3, and 710.4. So, as shown in FIG. 7e, storage node 710.1 has knowledge of the network address of storage node 710.4 with a hash address identifier of 9, which is the closest hash address identifier it knows to the target chunk hash of 11. Therefore, storage node 710.1 may directly forward 740 the peer message to storage node 710.4. Storage node 710.4 has knowledge of storage node 710.5 (among others) and may use the hash address identifier of 13 to determine that it is the correct target storage node for the peer message related to chunk hash 11. Storage node 710.4 may forward 742 the peer message to storage node 710.5. The peer message arrives at the target storage node in two steps, rather than the four steps it would have taken moving to the next node only.

Figure 8:
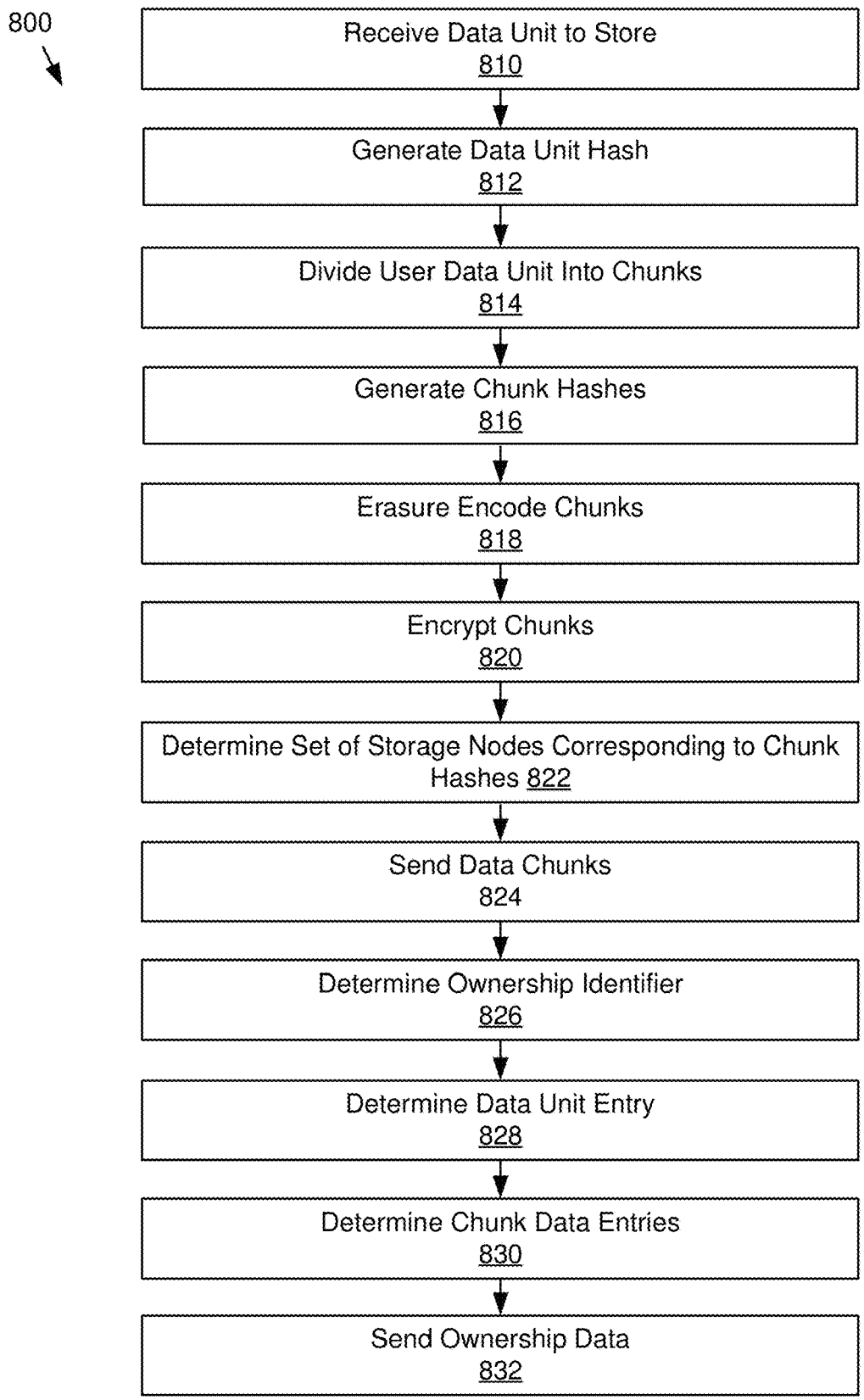
FIG. 8 is a flowchart of an example method of storing a data unit to the distributed NAS nodes.

As shown in FIG. 8, storage system 500 may be operated according to an example method for storing a data unit to the distributed NAS nodes, i.e., according to method 800 illustrated by blocks 810-832 in FIG. 8.

At block 810, a user data unit may be received to store in the storage system. For example, a primary storage node may receive a client storage request for a client file or data object.

At block 812, a user data unit hash may be determined. For example, the primary storage node may generate a hash identifier value for the data unit based on data unit metadata, such as the data unit name, path, or other metadata.

At block 814, the user data unit may be divided into data chunks. For example, the primary storage node may shard the data unit into a number of data chunks to be distributed among the storage nodes.

At block 816, chunk hashes may be generated for each data chunk. For example, the primary storage node may process the user data in each data chunk to generate a unique chunk hash identifier for that data chunk.

At block 818, the data chunks may be erasure encoded. For example, the primary storage node may erasure encode each data chunk according to an erasure encoding scheme for storing the data chunks.

At block 820, the data chunks may be encrypted. For example, the primary storage node may encrypt each data chunk using a data encryption key.

At block 822, a set of storage nodes corresponding to the chunk hashes may be determined. For example, the primary storage node may address a set of peer messages using the chunk hashes to locate target storage nodes in the node ring.

At block 824, the data chunks may be sent to the target storage nodes. For example, the primary storage node may send the data chunks based on the chunk hash identifiers as addresses and/or a set of network addresses returned from the respective storage nodes in response to the peer messages sent to the chunk hash identifiers.

At block 826, an ownership identifier may be determined. For example, the primary storage node may have an associated hash address identifier used as an ownership identifier.

At block 828, a data unit entry may be determined. For example, the primary storage node may generate a data unit entry including data unit metadata, the ownership identifier, and other data related to the data unit.

At block 830, chunk data entries may be determined. For example, the primary storage node may generate a chunk data entry for each data chunk that includes the chunk hash identifier, data unit hash identifier, and an index value.

At block 832, the ownership data may be sent. For example, the primary storage node may send the ownership data, including the data unit entry and the chunk data entries, to each target storage node.

Figure 9:
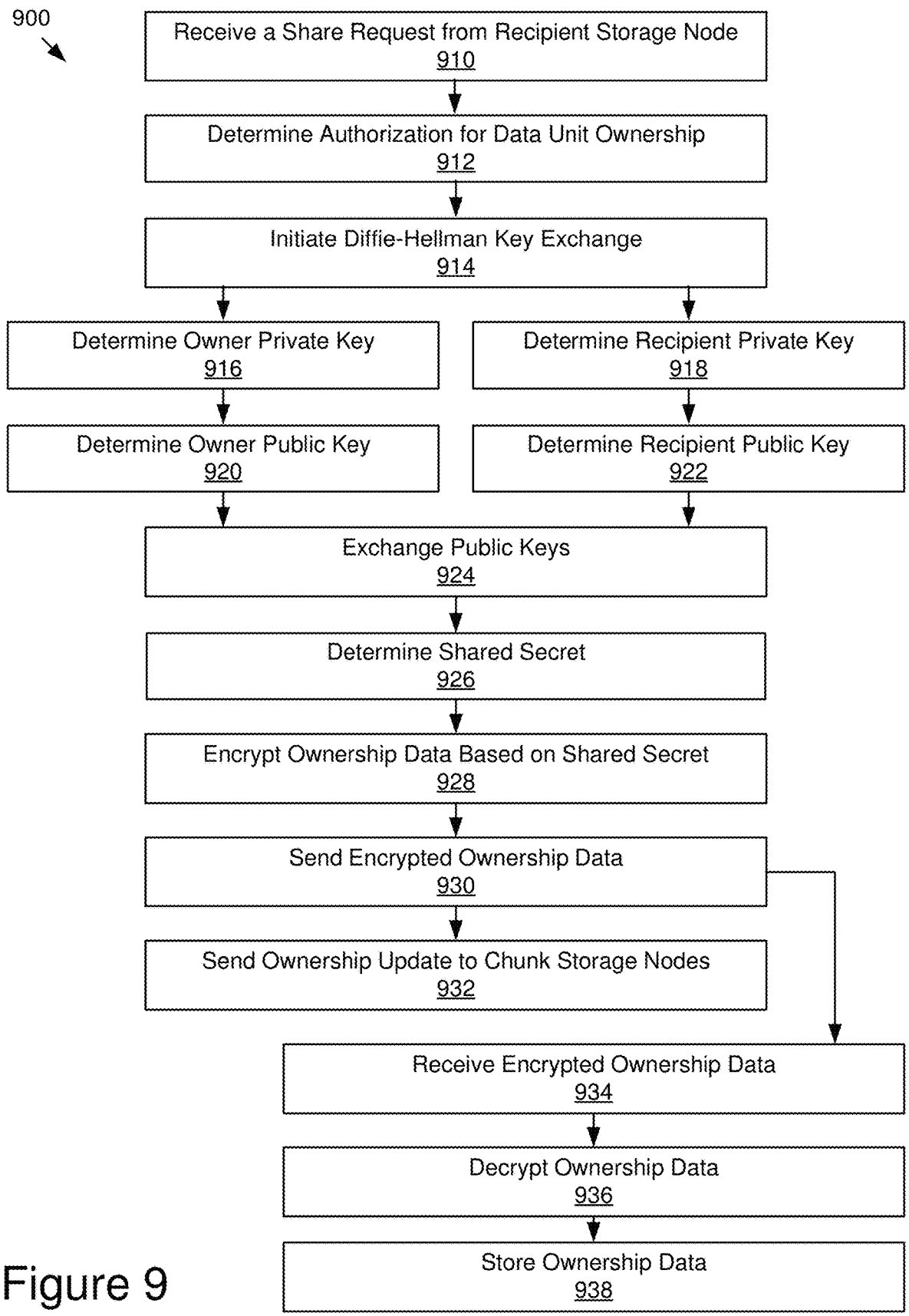
FIG. 9 is a flowchart of an example method of securely transferring ownership data from an owner node.

As shown in FIG. 9, storage system 500 may be operated according to an example method for securely transferring ownership data from an owner node, i.e., according to method 800 illustrated by blocks 910-938 in FIG. 9.

At block 910, a share request may be received from a recipient storage node. For example, the primary storage node for a user data file may receive a share request message from another storage node requesting to become another owner storage node capable of serving the user data file.

At block 912, authorization for data unit ownership may be determined. For example, the primary storage node may validate, based on authorization data from the client systems, that the recipient storage node is authorized to become a new owner of the user data unit.

At block 914, Diffie-Hellman key exchange may be initiated. For example, the primary storage node and recipient storage nodes may both be configured with Diffie-Hellman encryption algorithms that enable a shared secret value to be determined based on the exchange of public keys.

At blocks 916 and 918, the private keys are determined for both the owner and the recipient. For example, the primary storage node and the recipient storage node may each be configured with their own private keys.

At blocks 920 and 922, the public keys are determined for both the owner and the recipient. For example, the primary storage node and the recipient storage mode may each be configured with their own public keys that form a public-private key pair for their respective private keys.

At block 924, the public keys may be exchanged. For example, the primary storage node and the recipient storage node may each send their respective public keys to the other storage node.

At block 926, a shared secret value may be determined. For example, the primary storage node may include an owner data key that may be processed using the owner private key and the recipient public key to determine an encrypted key that may be sent to the recipient storage node. The recipient storage node may then use the owner public key (previously received) and recipient private key to decrypt the owner data key using the shared secret.

At block 928, ownership data may be encrypted based on the shared secret. For example, the primary storage node may encrypt the ownership data for the user data file based on the owner data key or, in some configurations, the shared secret value.

At block 930, the encrypted ownership data may be sent. For example, the primary storage node may send the encrypted ownership data to the recipient storage node.

At block 932, an ownership update may be sent to the chunk storage nodes. For example, the primary storage node may send an authorization message with the ownership identifier of the recipient storage node to each storage node that has a data chunk and copy of the ownership data using peer messages.

At block 934, the encrypted ownership data may be received. For example, the recipient storage node may receive the encrypted ownership data from the primary storage node.

At block 936, the ownership data may be decrypted. For example, the recipient storage node may use the shared secret value and/or owner data key to decrypt the ownership data for the user data file.

At block 938, the ownership data may be stored. For example, the recipient storage mode may store the ownership data in its own ownership datastore.

Figure 10:
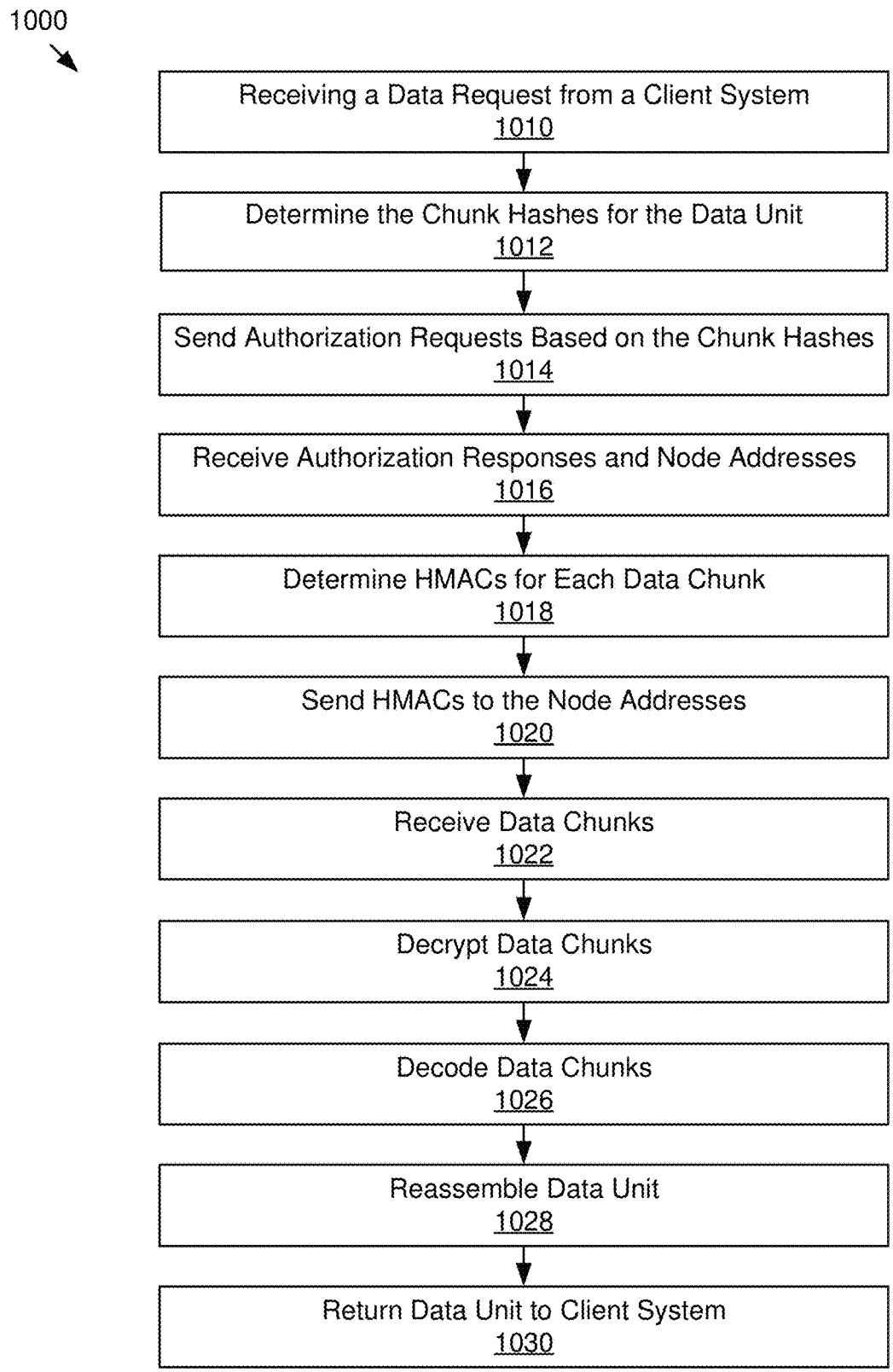
FIG. 10 is a flowchart of an example method of securely retrieving data chunks to serve a data request.

As shown in FIG. 10, storage system 500 may be operated according to an example method for securely retrieving data chunks to serve a data request, i.e., according to method 1000 illustrated by blocks 1010-1030 in FIG. 10.

At block 1010, a data request may be received from a client system. For example, a primary storage node may receive a data access request targeting a previously stored user data unit.

At block 1012, chunk hashes may be determined for the data unit. For example, the primary storage mode may determine the data unit hash identifier and use it to index the ownership data to determine the set of data chunk hash values for that data unit.

At block 1014, authorization requests may be sent based on the chunk hashes. For example, the primary storage node may send authorization requests addressed based on the chunk hashes as peer messages through the node ring.

At block 1016, authorization responses and node addresses may be received from the target storage nodes. For example, the primary storage node may receive responses to the authorization messages that include the network addresses for the storage nodes storing the data chunks.

At block 1018, HMACs may be determined for each data chunk. For example, the primary storage node may use the chunk hashes and the HMAC key stored with the ownership data for the data unit to generate a unique message authentication code value.

At block 1020, the HMACs may be sent to the node addresses. For example, the primary storage node may send the corresponding message authentication code value to each of the set of target storage modes based on the network addresses received at block 1016.

At block 1022, the data chunks may be received. For example, the primary storage node may receive the set of data chunks corresponding to the requested user data unit.

At block 1024, the data chunks may be decrypted. For example, the primary storage node may decrypt each of the data chunks using its stored data chunk decryption key.

At block 1026, the data chunks may be decoded. For example, the primary storage node may use the erasure encoding from the stored data blocks for error detection and/or correction and remove any erasure coding to return the original user data.

At block 1028, the data unit may be reassembled. For example, the primary storage node may use the index values for the set of data chunks to order the data chunks and combine them to form the original user data unit.

At block 1030, the user data unit may be returned to the client system. For example, the primary storage node may return the requested client data unit.

Figure 11:
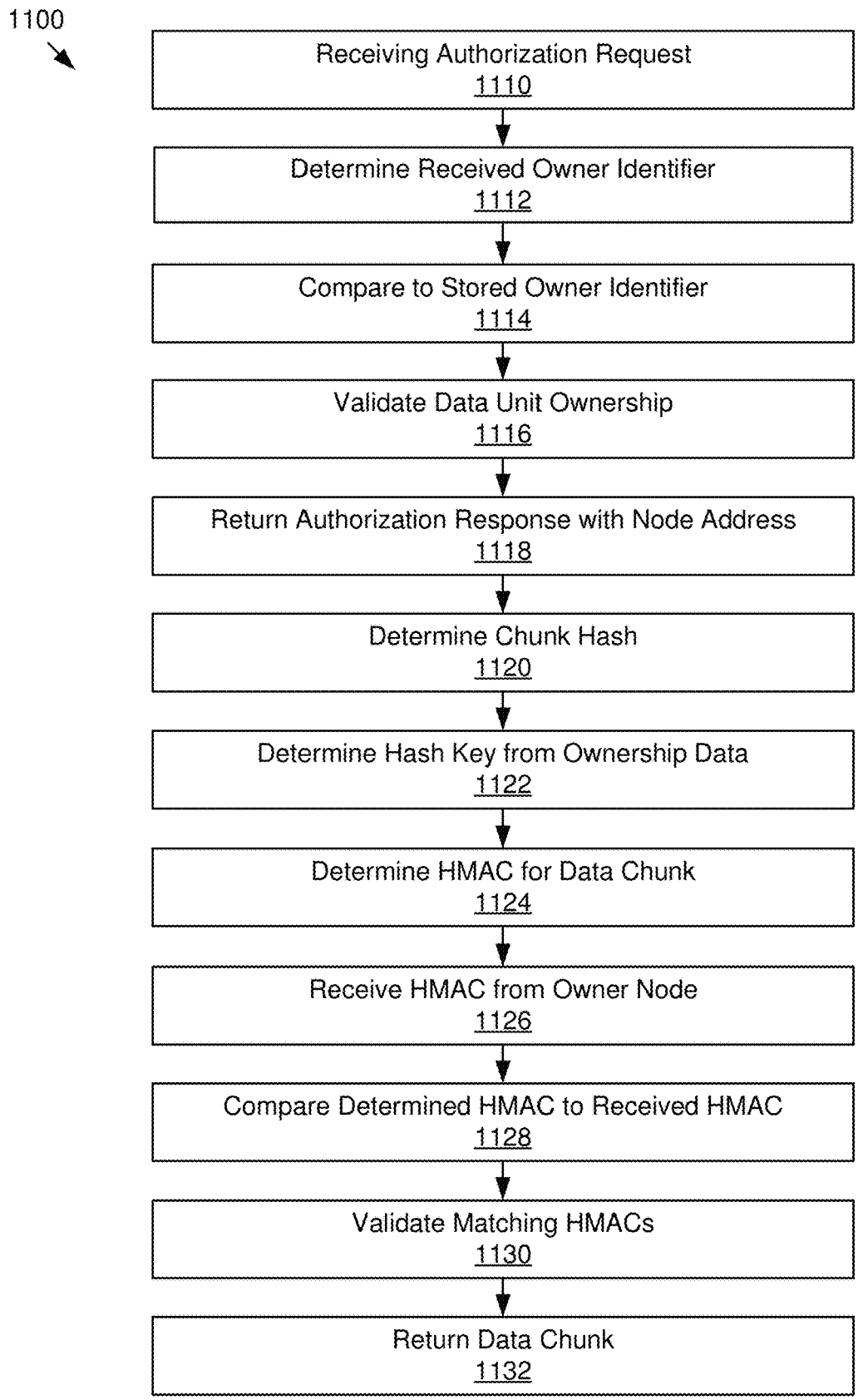
FIG. 11 is a flowchart of an example method of validating and returning a data chunk to the owner node for a data request.

As shown in FIG. 11, storage system 500 may be operated according to an example method for validating and returning a data chunk to the owner node for a data request, i.e., according to method 1100 illustrated by blocks 1110-1132 in FIG. 11.

At block 1110, an authorization request may be received. For example, a target storage node may receive an authorization request in a peer message directed to a target chunk hash for one of the data chunks stored in that storage node.

At block 1112, a received owner identifier may be determined. For example, the target storage node may determine the owner identifier from the authorization request as a parameter of the peer message.

At block 1114, the received owner identifier may be compared to a stored owner identifier. For example, the target storage node may use the target chunk hash and/or a corresponding data unit hash identifier as an index value for finding a previously stored owner identifier in the ownership data stored by the target storage node.

At block 1116, the data unit ownership may be validated. For example, the target storage node may compare the received owner identifier to the stored owner identifier and, if the owner identifiers match, the ownership is validated.

At block 1118, an authorization response and node address may be returned. For example, the target storage node may send a response message to the primary storage node that sent the authorization request with the network address of the target storage node.

At block 1120, the chunk hash may be determined. For example, the target storage node may determine the chunk hash identifier from the received authorization request that was addressed using the chunk hash identifier to locate the target storage node.

At block 1122, a hash key may be determined from the ownership data. For example, the target storage node may determine the hash key by reading it from a file entry in its ownership datastore for the data unit including the data chunk.

At block 1124, an HMAC may be determined for the data chunk. For example, the target storage node may process the chunk hash through an HMAC algorithm using the has key to generate a unique message authentication code.

At block 1126, an HMAC may be received from the owner node. For example, the target storage node may receive a unique message authentication code from the primary storage node calculated in a similar manner by the primary storage node.

At block 1128, the determined HMAC may be compared to the received HMAC. For example, the target storage node may compare the message authentication code it calculated to the message authentication code received from the primary storage node.

At block 1130, the matching HMACs may validate the access request for the data chunk. For example, the target storage node may determine, based on the two message authentication codes matching, that the retrieval request from the primary storage node is valid.

At block 1132, the data chunk may be returned. For example, the target storage node may retrieve the data chunk from its data storage devices and return the data chunk to the primary storage node.

Figure 12:
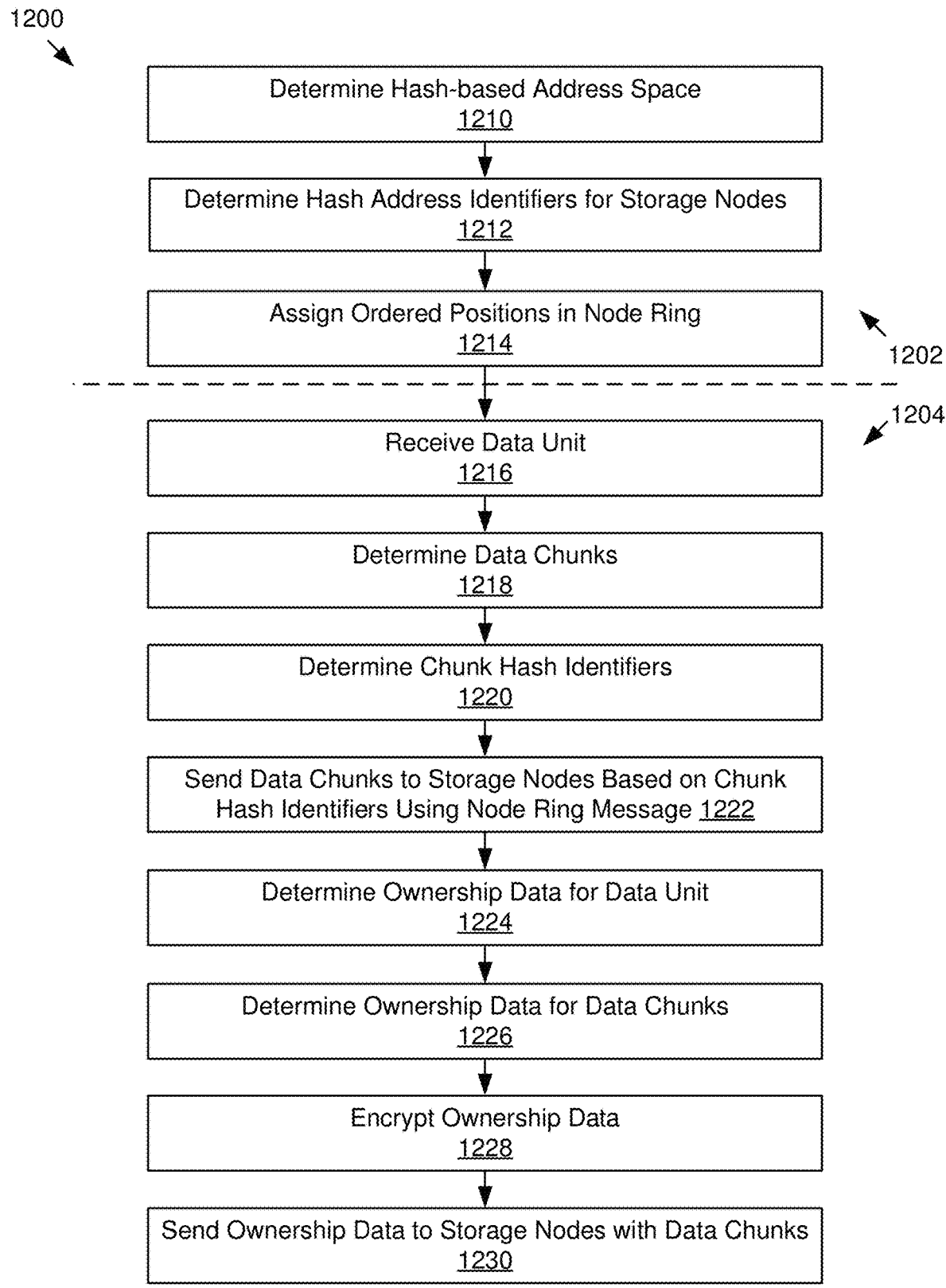
FIG. 12 is a flowchart of an example method of distributing a data unit among the nodes of a node ring.

As shown in FIG. 12, storage system 500 may be operated according to an example method for distributing a data unit among the nodes of a node ring, i.e., according to method 1200 illustrated by blocks 1210-1230 in FIG. 12. A first portion 1202 of method 1200 may be executed as storage nodes are configured in the storage ring. A second portion 1204 of method 1200 may be executed as data units are received by those storage nodes for distributed storage within the storage systems of the node ring.

At block 1210, hash-based address space may be determined. For example, the storage system may be configured for a peer network of network attached storage nodes with an address space sufficiently large to use consistent hashing for determining hash-based address, identifier, or key values for locating nodes, data units, and data chunks in the address space without conflicts.

At block 1212, hash address identifiers may be determined for storage nodes. For example, each storage node may generate a hash-based address identifier for itself using a consistent hashing function and their unique network addresses.

At block 1214, ordered positions may be assigned in the node ring. For example, as each storage node is inserted into the node ring, that storage node may use its hash address identifier to traverse the node ring until a storage node with a higher hash address identifier is found and the storage node may then collect the network addresses of the adjacent storage nodes and update those nodes with its own new neighbor information.

At block 1216, a data unit may be received by a storage node. For example, a primary storage node may receive a data unit storage request from a corresponding client system.

At block 1218, data chunks may be determined for the data unit. For example, the primary storage node may shard the data unit into a set of data chunks.

At block 1220, chunk hash identifiers may be determined for the data chunks. For example, the primary storage node may use the same consistent hashing function to determine chunk hash identifiers based on the user data in the chunk hashes.

At block 1222, data chunks may be sent to storage nodes based on chunk hash identifiers and using node ring messages. For example, the primary storage node may determine a target storage node for each data chunk by sending a peer message to the node ring using the chunk hash identifier to distribute the data chunks.

At block 1224, ownership data may be determined for the data unit. For example, the primary storage node may determine and store a data unit entry based on data unit metadata and access control data, such as validation and/or encryption keys and ownership identifiers.

At block 1226, ownership data may be determined for data chunks. For example, the primary storage node may determine and store a set of data chunk entries based on the chunk hash identifiers and other data for relating the data chunks to the data unit and each other.

At block 1228, ownership data may be encrypted. For example, the primary storage node may encrypt the ownership data prior to sending it over the network.

At block 1230, the ownership data may be sent to the storage nodes with the data chunks. For example, the primary storage node may send a copy of the ownership data for the data unit and data chunks to each of the storage nodes receiving a data chunk.

Figure 13:
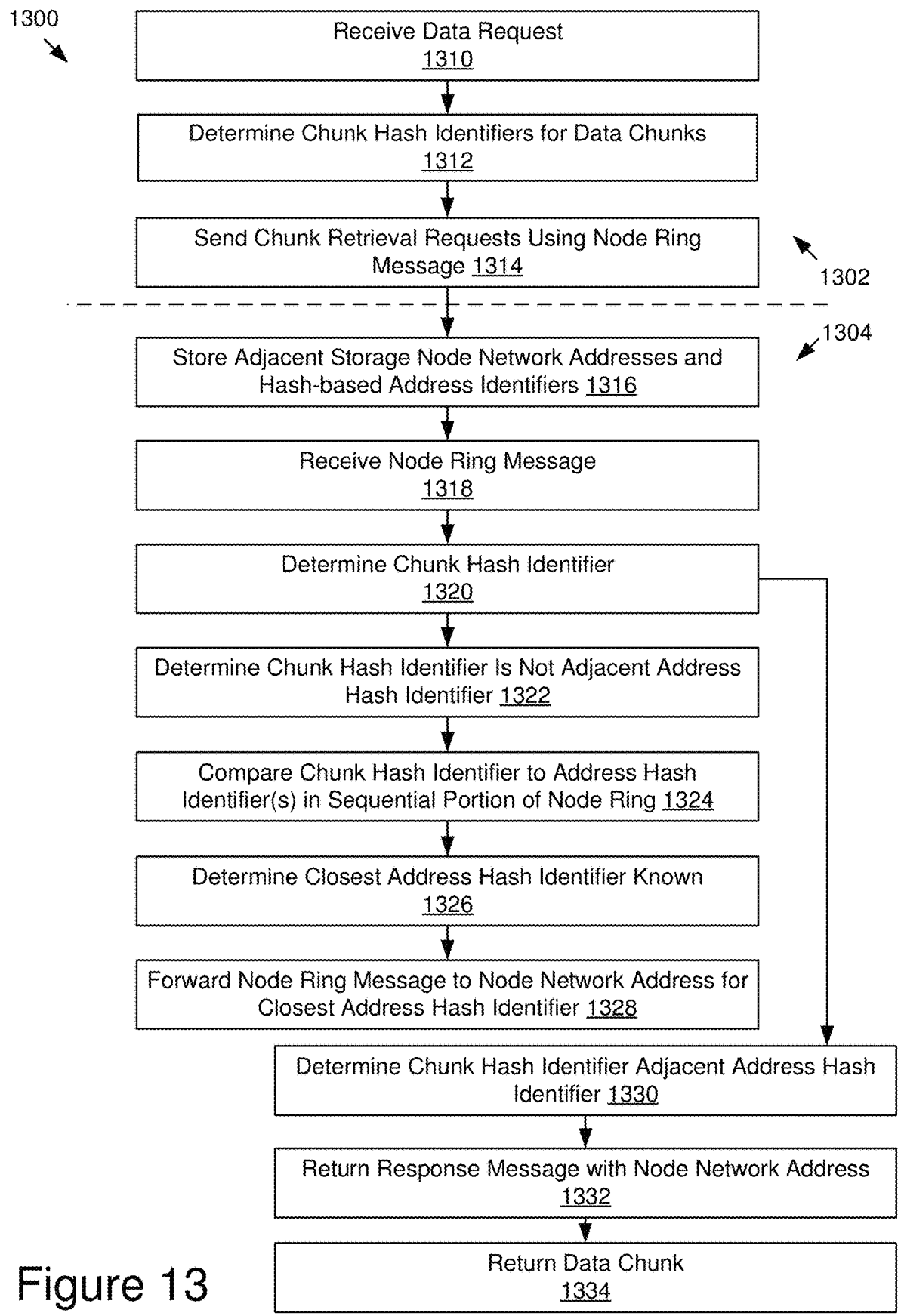
FIG. 13 is a flowchart of an example method of locating data chunks in the node ring for a data request.

As shown in FIG. 13, storage system 500 may be operated according to an example method for locating data chunks in the node ring for a data request, i.e., according to method 1300 illustrated by blocks 1310-1334 in FIG. 13. A first portion 1302 of method 1300 may be executed by the primary storage node to initiate data retrieval. A second portion 1304 of method 1300 may be executed by successive storage nodes in the node ring to forward chunk retrieval requests and ultimately return the data chunk.

At block 1310, a data request may be received. For example, a primary storage node may receive a data access request from a client system.

At block 1312, chunk hash identifiers may be determined for the data chunks. For example, the primary storage node may use the ownership data for the requested data unit to determine the data chunks and their corresponding chunk hash identifiers.

At block 1314, chunk retrieval requests may be sent for each data chunk using node ring messages. For example, the primary storage node may send chunk retrieval requests using peer messages to the node ring addressed based on the chunk hash identifiers.

At block 1316, network addresses and hash-based address identifiers may be stored for adjacent storage nodes by each storage node. For example, each storage node may include a lookup data structure with the network addresses and hash-based node address identifiers for at least the preceding and subsequent storage nodes in the node ring.

At block 1318, a node ring message may be received by a storage node. For example, a storage node may receive a peer message addressed based on the chunk hash identifier, such as from the primary storage node or a forwarding storage node subsequent to the primary storage node.

At block 1320, the chunk hash identifier may be determined. For example, the storage node may parse the chunk hash identifier from the peer message.

At block 1322, that the chunk hash identifier is not adjacent the address hash identifier may be determined. For example, the storage node may compare the chunk hash identifier to its hash-based node address identifier and determine that it is not less than the node address identifier and should be forwarded further along the node ring.

At block 1324, the chunk hash identifier may be compared to address hash identifiers in a sequential portion of the node ring. For example, the storage node may include a lookup data structure that includes at least the next storage node and may include a number of additional storage nodes (in a look ahead or finger table) and use the chunk hash identifier to compare positions in the hash-based address space.

At block 1326, a closest address hash identifier may be determined from those known to the storage node. For example, the storage node may use the position comparisons at block 1324 to determine a forward storage node that is closer to the chunk hash identifier, or even the next storage node after the chunk hash identifier that is considered "closest" to and the target storage node for the node ring message.

At block 1328, the node ring message may be forwarded to the storage node network address for the closest address hash identifier. For example, the storage node may forward the node ring message to the network address of the closest storage node determined at block 1326.

At block 1330, the chunk hash identifier may be determined to be adjacent the address hash identifier. For example, the storage node may determine that it is the storage node after the chunk hash identifier and, thus, closest and the target storage node for the node ring message.

At block 1332, a response message with the node network address may be returned. For example, the storage node may return a response message with a the network address of the storage node to facilitate additional messages between the primary storage node and this storage node for completing the return of the target data chunk.

At block 1334, the data chunk may be returned. For example, the storage mode may validate the retrieval request and return the requested data chunk.

Figure 14:
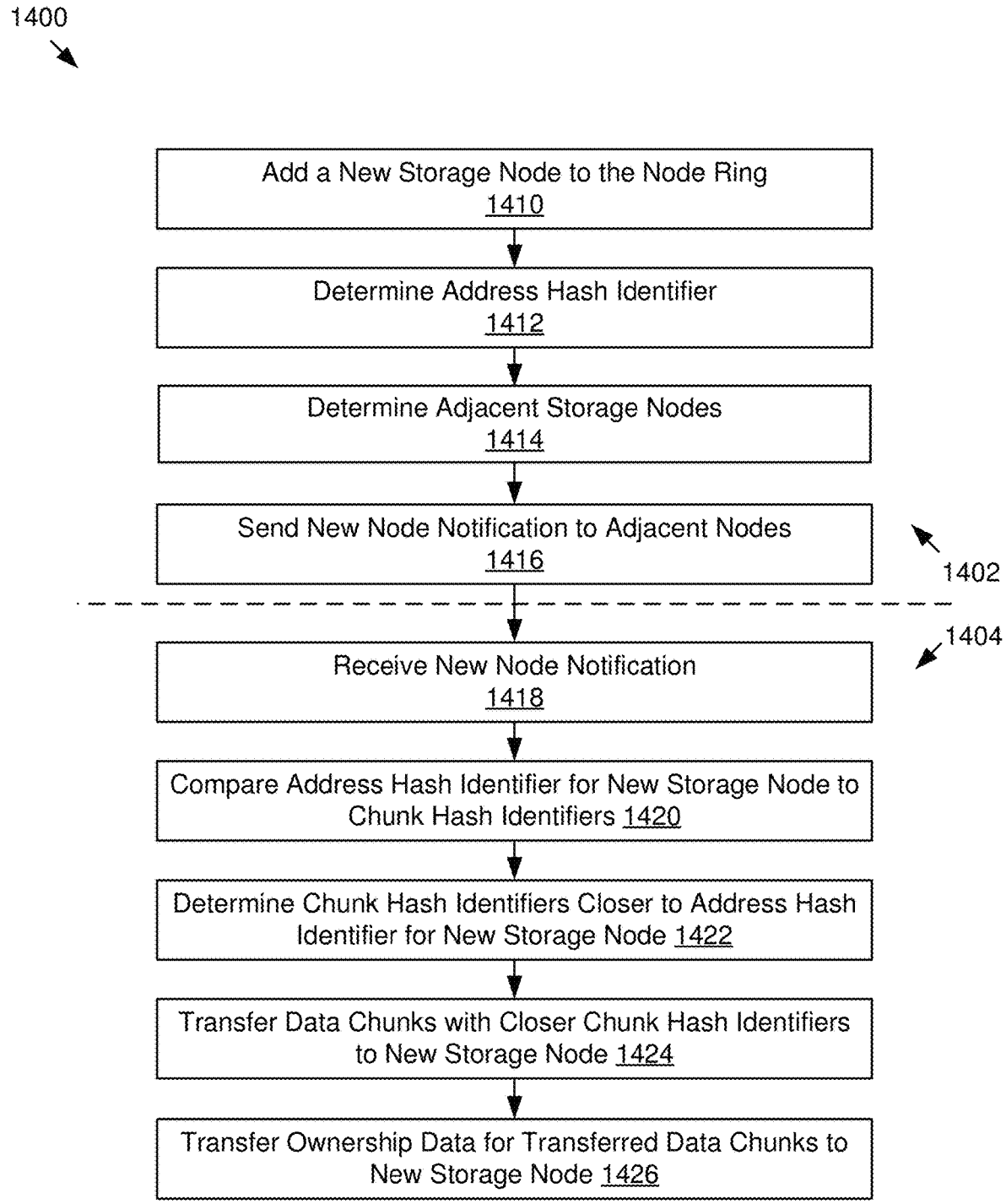
FIG. 14 is a flowchart of an example method of adding a new node to the node ring.

As shown in FIG. 14, storage system 500 may be operated according to an example method for adding a new node to the node ring, i.e., according to method 1400 illustrated by blocks 1410-1426 in FIG. 14. A first portion 1402 of method 1400 may be executed by the new storage node being inserted. A second portion 1404 of method 1400 may be executed by an adjacent (successor) storage node in the node ring to adjust for the addition of the new storage node.

At block 1410, a new storage node may be added to the node ring. For example, a new network attached storage node may be configured to join an existing storage node ring.

At block 1412, an address hash identifier may be determined. For example, the new storage node may calculate its address hash identifier based on using the consistent hashing algorithm to hash its network address.

At block 1414, adjacent storage nodes may be determined. For example, the new storage node may be configured with at least one network address in the existing storage node and may send node ring messages to determine the network address of at least the next adjacent storage node in a traversal direction of the node ring.

At block 1416, new node notification may be sent to adjacent storage nodes. For example, the new storage node may send a new node notification to the next adjacent storage node and receive network address-hash identifier pairs for both the next adjacent storage node and prior adjacent storage node, then send a new node notification to the prior adjacent storage node.

At block 1418, a new node notification may be received. For example, the next adjacent storage node may receive the new node notification for the new storage node.

At block 1420, the address hash identifier for the new storage node may be compared to the chunk hash identifiers for the data chunks stored in the next adjacent storage node. For example, the next adjacent storage node may use the address hash identifier received in the new node notification to evaluate each chunk hash identifier in its ownership datastore.

At block 1422, chunk hash identifiers closer to the address hash identifier of the new storage node may be determined. For example, the next adjacent storage node may determine the chunk hash identifiers that are lower than the address hash identifier of the new storage node.

At block 1424, data chunks with closer chunk hash identifiers to the new storage node may be transferred. For example, the next adjacent storage node may transfer the set of data chunks with chunk hash identifier lower than the new storage node to the new storage node.

At block 1426, ownership data for the transferred data chunks may be transferred to the new storage node. For example, the next adjacent storage node may transfer the ownership data corresponding to the data chunks transferred at block 1424 to the new storage node.

Figure 15:
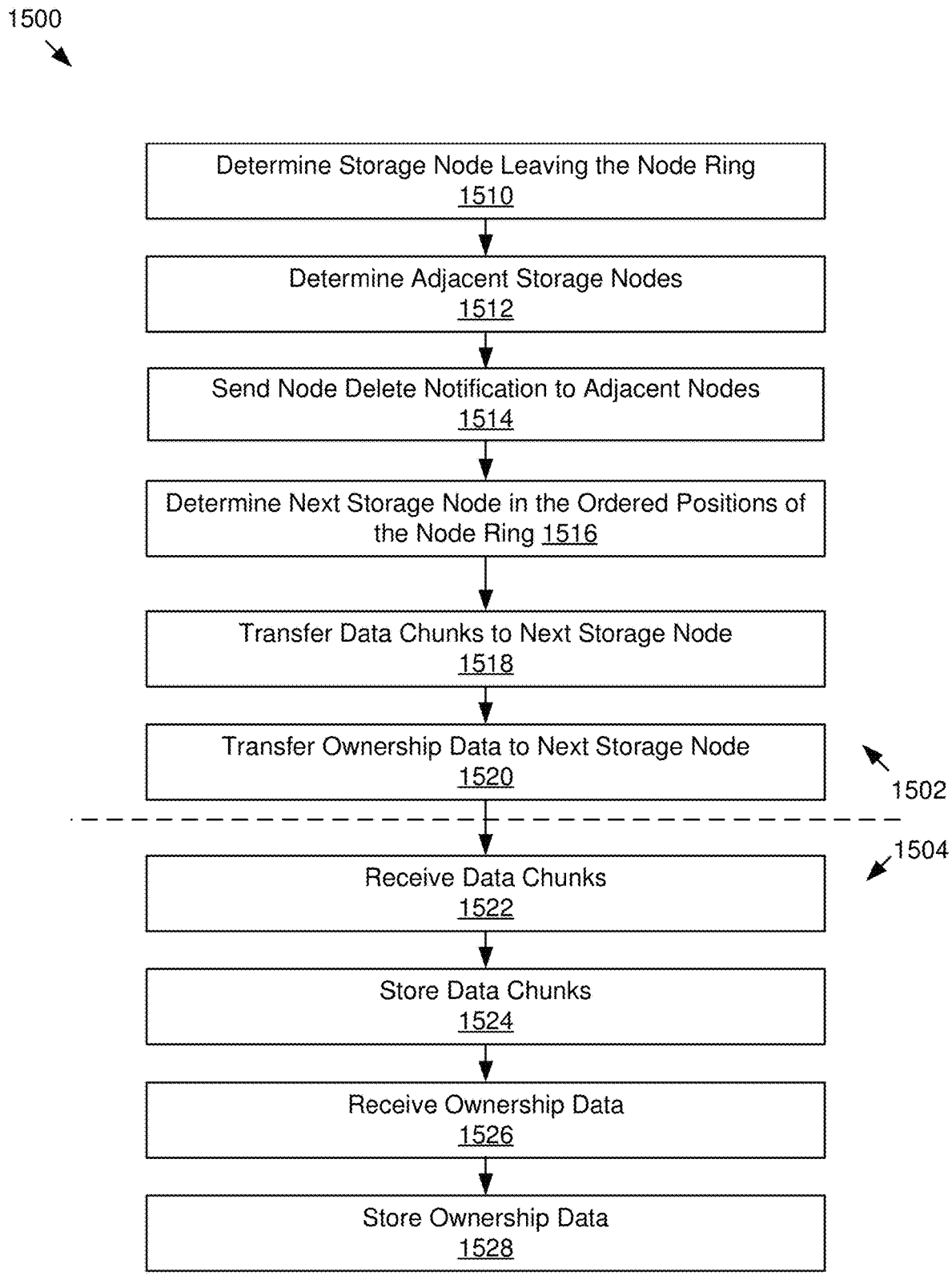
FIG. 15 is a flowchart of an example method of removing a node from the node ring.

As shown in FIG. 15, storage system 500 may be operated according to an example method for removing a node from the node ring, i.e., according to method 1500 illustrated by blocks 1510-1528 in FIG. 15. A first portion 1502 of method 1500 may be executed by the storage node preparing to leave the node ring. A second portion 1504 of method 1500 may be executed by an adjacent (successor) storage node in the node ring to adjust for the removal of the leaving storage node.

At block 1510, determine that storage node is leaving the node ring. For example, the leaving storage node may be notified by an administrator or client system that the storage node is being removed from the node ring.

At block 1512, adjacent storage nodes may be determined. For example, the leaving storage node may include a node lookup data structure that include the network addresses and address hash identifiers of the next and prior adjacent storage nodes.

At block 1514, node delete notification may be sent to the adjacent nodes. For example, the leaving storage node may send a delete notification message with the next and prior adjacent storage node network-hash address pairs to both adjacent storage nodes.

At block 1516, the next storage node may be determined in the ordered positions of the node ring. For example, the leaving storage node may identify the next adjacent storage node that has the next highest hash address identifier to the leaving storage node.

At block 1518, data chunks may be transferred to the next storage node. For example, the leaving storage node may transfer all of the data chunks it has stored to the next storage node.

At block 1520, ownership data may be transferred to the next storage node. For example, the leaving storage node may transfer all of the ownership data corresponding to the transferred data chunks to the next storage node.

At block 1522, the data chunks may be received. For example, the next storage node may receive the data chunks transferred by the leaving storage node.

At block 1524, the data chunks may be stored. For example, the next storage node may store the data chunks received from the leaving storage node to the data storage devices of the next storage node.

At block 1526, ownership data may be received. For example, the next storage node may receive the ownership data transferred by the leaving storage node.

At block 1528, the ownership data may be stored. For example, the next storage node may store the ownership data from the leaving storage node in the ownership datastore of the next storage node.

While at least one exemplary embodiment has been presented in the foregoing detailed description of the technology, it should be appreciated that a vast number of variations may exist. It should also be appreciated that an exemplary embodiment or exemplary embodiments are examples, and are not intended to limit the scope, applicability, or configuration of the technology in any way. Rather, the foregoing detailed description will provide those skilled in the art with a convenient road map for implementing an exemplary embodiment of the technology, it being understood that various modifications may be made in a function and/or arrangement of elements described in an exemplary embodiment without departing from the scope of the technology, as set forth in the appended claims and their legal equivalents.

As will be appreciated by one of ordinary skill in the art, various aspects of the present technology may be embodied as a system, method, or computer program product. Accordingly, some aspects of the present technology may take the form of an entirely hardware embodiment, an entirely software embodiment (including firmware, resident software, micro-code, etc.), or a combination of hardware and software aspects that may all generally be referred to herein as a circuit, module, system, and/or network. Furthermore, various aspects of the present technology may take the form of a computer program product embodied in one or more computer-readable mediums including computer-readable program code embodied thereon.

Any combination of one or more computer-readable mediums may be utilized. A computer-readable medium may be a computer-readable signal medium or a physical computer-readable storage medium. A physical computer readable storage medium may be, for example, but not limited to, an electronic, magnetic, optical, crystal, polymer, electromagnetic, infrared, or semiconductor system, apparatus, or device, etc., or any suitable combination of the foregoing. Non-limiting examples of a physical computer-readable storage medium may include, but are not limited to, an electrical connection including one or more wires, a portable computer diskette, a hard disk, random access memory (RAM), read-only memory (ROM), an erasable programmable read-only memory (EPROM), an electrically erasable programmable read-only memory (EEPROM), a Flash memory, an optical fiber, a compact disk read-only memory (CD-ROM), an optical processor, a magnetic processor, etc., or any suitable combination of the foregoing. In the context of this document, a computer-readable storage medium may be any tangible medium that can contain or store a program or data for use by or in connection with an instruction execution system, apparatus, and/or device.

Computer code embodied on a computer-readable medium may be transmitted using any appropriate medium, including but not limited to, wireless, wired, optical fiber cable, radio frequency (RF), etc., or any suitable combination of the foregoing. Computer code for carrying out operations for aspects of the present technology may be written in any static language, such as the C programming language or other similar programming language. The computer code may execute entirely on a user's computing device, partly on a user's computing device, as a stand-alone software package, partly on a user's computing device and partly on a remote computing device, or entirely on the remote computing device or a server. In the latter scenario, a remote computing device may be connected to a user's computing device through any type of network, or communication system, including, but not limited to, a local area network (LAN) or a wide area network (WAN), Converged Network, or the connection may be made to an external computer (e.g., through the Internet using an Internet Service Provider).

Various aspects of the present technology may be described above with reference to flowchart illustrations and/or block diagrams of methods, apparatus, systems, and computer program products. It will be understood that each block of a flowchart illustration and/or a block diagram, and combinations of blocks in a flowchart illustration and/or block diagram, can be implemented by computer program instructions. These computer program instructions may be provided to a processing device (processor) of a general purpose computer, special purpose computer, or other programmable data processing apparatus to produce a machine, such that the instructions, which can execute via the processing device or other programmable data processing apparatus, create means for implementing the operations/acts specified in a flowchart and/or block(s) of a block diagram.

Some computer program instructions may also be stored in a computer-readable medium that can direct a computer, other programmable data processing apparatus, or other device(s) to operate in a particular manner, such that the instructions stored in a computer-readable medium to produce an article of manufacture including instructions that implement the operation/act specified in a flowchart and/or block(s) of a block diagram. Some computer program instructions may also be loaded onto a computing device, other programmable data processing apparatus, or other device(s) to cause a series of operational steps to be performed on the computing device, other programmable apparatus or other device(s) to produce a computer-implemented process such that the instructions executed by the computer or other programmable apparatus provide one or more processes for implementing the operation(s)/act(s) specified in a flowchart and/or block(s) of a block diagram.

A flowchart and/or block diagram in the above figures may illustrate an architecture, functionality, and/or operation of possible implementations of apparatus, systems, methods, and/or computer program products according to various aspects of the present technology. In this regard, a block in a flowchart or block diagram may represent a module, segment, or portion of code, which may comprise one or more executable instructions for implementing one or more specified logical functions. It should also be noted that, in some alternative aspects, some functions noted in a block may occur out of an order noted in the figures. For example, two blocks shown in succession may, in fact, be executed substantially concurrently, or blocks may at times be executed in a reverse order, depending upon the operations involved. It will also be noted that a block of a block diagram and/or flowchart illustration or a combination of blocks in a block diagram and/or flowchart illustration, can be implemented by special purpose hardware-based systems that may perform one or more specified operations or acts, or combinations of special purpose hardware and computer instructions.

While one or more aspects of the present technology have been illustrated and discussed in detail, one of ordinary skill in the art will appreciate that modifications and/or adaptations to the various aspects may be made without departing from the scope of the present technology, as set forth in the following claims.

The invention claimed is:

1. A storage system, comprising:
a first storage node comprising:
   at least one non-volatile data storage device configured to store user data units;
   a network interface configured for peer-to-peer communication over a network with a plurality of storage nodes; and
   at least one processor configured to, alone or in combination:
     receive a user data unit to be stored;
     generate a data unit hash for the user data unit;
     divide the user data unit into a plurality of data chunks;
     generate chunk hashes for the plurality of data chunks;
     determine, using the chunk hashes of the plurality of data chunks, a target set of storage nodes from the plurality of storage nodes; and
     send, to each storage node in the target set of storage nodes:
       a corresponding data chunk from the plurality of data chunks; and
       ownership data configured in a data ownership data structure comprising a data unit entry for the user data unit, wherein the data unit entry comprises:
         an owner identifier for the first storage node;
         a hash key for the user data unit; and
         the data unit hash for the user data unit.

2. The storage system of claim 1, wherein the at least one processor is further configured to, alone or in combination and prior to sending the corresponding data chunk:
   erasure encode the corresponding data chunk; and
   encrypt the corresponding data chunk.

3. The storage system of claim 1, wherein the data ownership data structure further comprises the chunk hashes for the plurality of data chunks.

4. The storage system of claim 3, wherein:
the data ownership data structure further comprises a set of chunk entries for the plurality of data chunks; and
each chunk entry comprises:
   the chunk hash for that data chunk;
   the data unit hash for the user data unit; and
   an index value configured to order the plurality of data chunks.

5. The storage system of claim 3, wherein the data unit entry further comprises:
   a user data unit identifier for the user data unit; and
   a storage path value for the user data unit.

6. The storage system of claim 1, wherein the at least one processor is further configured to, alone or in combination:
   determine an ownership data exchange key; and
   encrypt, prior to sending the ownership data and using the ownership data exchange key, the ownership data.

7. The storage system of claim 6, wherein:
the at least one processor is further configured to, alone or in combination, initiate Diffie-Hellman key exchange with at least one storage node of the plurality of storage nodes to send the ownership data exchange key to the at least one storage node;
the at least one storage node is configured to:
   receive, using Diffie-Hellman key exchange, the ownership data exchange key;
   decrypt the ownership data; and
   store the ownership data in a data ownership data structure in a non-volatile memory of the at least one storage node; and
each storage node of the plurality of storage nodes is configured to:
   act as a primary owner for at least one user data unit;
   act as a secondary owner for at least one user data unit; and
   store at least one data chunk for at least one user data unit.

8. The storage system of claim 1, wherein the at least one processor is further configured to, alone or in combination:
   receive, from a second storage node from the plurality of storage nodes, a share request to serve the user data unit;
   determine an ownership data exchange key;
   execute, for the ownership data exchange key, secure key exchange with the second storage node;
   encrypt, using the ownership data exchange key, the ownership data for the user data unit;
   send, to the second storage node, the encrypted ownership data for the user data unit; and
   send, to the set of target storage nodes, an authorization update indicating the second storage node.

9. The storage system of claim 8, further comprising:
the second storage node configured to:
   receive, from a client system, a user data request for the user data unit;
   send the share request to the first storage node;
   receive the ownership data exchange key;
   receive the encrypted ownership data for the user data unit;
   decrypt, using the ownership data exchange key, the encrypted ownership data;
   send, based on the ownership data, a plurality of data chunk requests to the set of target storage nodes;
   receive, from the set of target storage nodes, the plurality of data chunks;
   reassemble the user data unit; and
   serve, to the client system, the user data unit.

10. The storage system of claim 1, wherein:
the at least one processor is further configured to, alone or in combination:
   receive, from a client system, a user data request for the user data unit;
   determine the chunk hashes for the plurality of data chunks;
   send, based on the chunk hashes for the plurality of data chunks, authorization requests including the owner identifier to the set of target storage nodes;
   determine, based on each data chunk hash and the hash key, a first hash-based message authentication code for each data chunk of the plurality of data chunks; and send, to each target storage node in the set of target storage nodes, the hash-based message authentication code for the data chunk stored by that target storage node; and the plurality of target storage nodes are is configured to:
validate, based on the owner identifier in the authorization request and the owner identifier in the ownership data stored in that target storage node, the authorization of the first storage node;
determine, based on the data chunk hash and hash key in the ownership data stored in that target storage node, a second hash-based message authentication code for the data chunk stored in that target storage node;
compare the first hash-based message authentication code to the second hash-based message authentication code for the data chunk stored in that target storage node; and
return, responsive to the first hash-based message authentication code matching the second hash-based message authentication code, the data chunk stored in that target storage node to the first storage node.

11. A computer-implemented method, comprising:
receiving, by a first storage node of a plurality of storage nodes, a user data unit to be stored;
dividing the user data unit into a plurality of data chunks;
determining, by the first storage node and using chunk hashes of the plurality of data chunks, a target set of storage nodes from the plurality of storage nodes; and
sending, by the first storage node and to each storage node in the target set of storage nodes:
a corresponding data chunk from the plurality of data chunks; and
ownership data comprising:
an owner identifier for the first storage node;
a hash key for the user data unit; and
the chunk hashes for the plurality of data chunks;
receiving, by the first storage node and from a client system, a user data request for the user data unit;
determining, by the first storage node, the chunk hashes for the plurality of data chunks;
sending, by the first storage node and based on the chunk hashes for the plurality of data chunks, authorization requests including the owner identifier to the set of target storage nodes;
determining, by the first storage node and based on each data chunk hash and the hash key, a first hash-based message authentication code for each data chunk of the plurality of data chunks; and
sending, by the first storage node and to each target storage node in the set of target storage nodes, the hash-based message authentication code for the data chunk stored by that target storage node.

12. The computer-implemented method of claim 11, further comprising, prior to sending the corresponding data chunk:
erasure encoding, by the first storage node, the corresponding data chunk; and
encrypting, by the first storage node, the corresponding data chunk.

13. The computer-implemented method of claim 12, further comprising: generating, by the first storage node:
a data unit hash for the user data unit; and
the chunk hashes for the plurality of data chunks, wherein the ownership data is configured in a data ownership data structure comprising a data unit entry for the user data unit comprising:
the data unit hash for the user data unit;
the owner identifier for the first storage node; and
the hash key for the user data unit.

14. The computer-implemented method of claim 13, wherein:
the data ownership data structure further comprises a set of chunk entries for the plurality of data chunks; and
each chunk entry comprises:
the chunk hash for that data chunk;
the data unit hash for the user data unit; and
an index value configured to order the plurality of data chunks.

15. The computer-implemented method of claim 11, further comprising:
determining, by the first storage node, an ownership data exchange key; and
encrypting, by the first storage node and prior to sending the ownership data, the ownership data using the ownership data exchange key.

16. The computer-implemented method of claim 15, further comprising:
initiating, by the first storage node, Diffie-Hellman key exchange with at least one storage node of the plurality of storage nodes to send the ownership data exchange key to the at least one storage node;
receiving, by the at least one storage node and using Diffie-Hellman key exchange, the ownership data exchange key;
decrypting, by the at least one storage node and using the ownership data exchange key, the ownership data; and
storing, by the at least one storage node, the ownership data in a data ownership data structure in a non-volatile memory of the at least one storage node.

17. The computer-implemented method of claim 11, further comprising:
receiving, by the first storage node and from a second storage node in the plurality of storage nodes, a share request to serve the user data unit;
determining, by the first storage node, an ownership data exchange key;
executing, between the first storage node and the second storage node, secure key exchange for the ownership data exchange key;
encrypting, by the first storage node and using the ownership data exchange key, the ownership data for the user data unit;
sending, by the first storage node to the second storage node, the encrypted ownership data for the user data unit; and
sending, by the first storage node and to the set of target storage nodes, an authorization update indicating the second storage node.

18. The computer-implemented method of claim 17, further comprising:
receiving, by the second storage node and from a client system, a user data request for the user data unit;
sending, by the second storage node, the share request to the first storage node;
receiving, by the second storage node, the ownership data exchange key;
receiving, by the second storage node, the encrypted ownership data for the user data unit;
decrypting, by the second storage node and using the ownership data exchange key, the encrypted ownership data;

sending, by the second storage node and based on the ownership data, a plurality of data chunk requests to the set of target storage nodes;

receiving, by the second storage node and from the set of target storage nodes, the plurality of data chunks;

reassembling, by the second storage node, the user data unit; and serving, by the second storage node and to the client system, the user data unit.

19. The computer-implemented method of claim 11, further comprising:

validating, by each storage node in the set of target storage nodes, the authorization of the first storage node based on the owner identifier in the authorization request and the owner identifier in the ownership data stored in that target storage node;

determining, by each storage node in the set of target storage nodes and based on the data chunk hash and hash key in the ownership data stored in that target storage node, a second hash-based message authentication code for the data chunk stored in that target storage node;

comparing, by each storage node in the set of target storage nodes, the first hash-based message authentication code to the second hash-based message authentication code for the data chunk stored in that target storage node; and returning, by each storage node in the set of target storage nodes and responsive to the first hash-based message authentication code matching the second hash-based message authentication code, the data chunk stored in that target storage node to the first storage node.

20. A storage node comprising:

at least one non-volatile data storage device configured to store user data units;

a network interface configured for peer-to-peer communication over a network with a plurality of storage nodes;

means for receiving a user data unit to be stored;

means for dividing the user data unit into a plurality of data chunks;

means for determining, using chunk hashes of the plurality of data chunks, a target set of storage nodes from the plurality of storage nodes;

means for sending, to each storage node in the target set of storage nodes:

a corresponding data chunk from the plurality of data chunks; and ownership data comprising:

an owner identifier for the storage node;

a hash key for the user data unit; and the chunk hashes for the plurality of data chunks;

means for determining an ownership data exchange key:

means for initiating Diffie-Hellman key exchange with at least one storage node of the plurality of storage nodes to send the ownership data exchange key to the at least one storage node; and means for encrypting, prior to sending the ownership data, the ownership data using the ownership data exchange key, wherein the at least one storage node of the plurality of storage nodes is configured to:

receive, using Diffie-Hellman key exchange, the ownership data exchange key;

decrypt, using the ownership data exchange key, the ownership data; and store the ownership data in a data ownership data structure in a non-volatile memory of the at least one storage node.

* * * * *